United States Patent
Yokota et al.

(10) Patent No.: US 7,596,441 B2
(45) Date of Patent: Sep. 29, 2009

(54) POWER STEERING DEVICE

(75) Inventors: Tadaharu Yokota, Kanagawa (JP);
Kiyoshi Inoue, Kanagawa (JP); Toru Takahashi, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/450,393

(22) Filed: Jun. 12, 2006

(65) Prior Publication Data

US 2007/0043490 A1  Feb. 22, 2007

(30) Foreign Application Priority Data

Aug. 22, 2005  (JP) ............................. 2005-239335

(51) Int. Cl.
*B62D 5/00* (2006.01)
*B62D 6/00* (2006.01)
*G06F 7/00* (2006.01)

(52) U.S. Cl. .............................. 701/41; 701/1; 701/36; 701/42; 701/43; 701/44; 180/410; 180/412; 180/413; 180/414; 180/415; 180/416; 180/417; 180/421; 180/422; 180/442; 180/443; 180/444; 180/446

(58) Field of Classification Search ............... 701/1, 701/36, 41–44; 180/410, 412–417, 421, 180/422, 442–444, 446
See application file for complete search history.

(56) References Cited

U.S. PATENT DOCUMENTS

| 5,740,040 | A | * | 4/1998 | Kifuku et al. | 701/41 |
| 5,982,137 | A | * | 11/1999 | Endo | 318/812 |
| 6,152,254 | A | * | 11/2000 | Phillips | 180/422 |
| 6,987,371 | B2 | | 1/2006 | Kifuku | |
| 2002/0116105 | A1 | * | 8/2002 | Chen et al. | 701/41 |
| 2002/0170769 | A1 | * | 11/2002 | Sakaki et al. | 180/441 |
| 2003/0011334 | A1 | * | 1/2003 | Kifuku | 318/432 |
| 2003/0106738 | A1 | * | 6/2003 | Yoneda et al. | 180/446 |
| 2003/0144780 | A1 | * | 7/2003 | Recker et al. | 701/41 |
| 2005/0051377 | A1 | * | 3/2005 | Palmberg et al. | 180/421 |
| 2005/0183901 | A1 | * | 8/2005 | Lesther et al. | 180/421 |

FOREIGN PATENT DOCUMENTS

| DE | 3920862 | 1/1991 |
| DE | 10151177 | 1/2003 |
| DE | 10250300 | 5/2004 |

(Continued)

*Primary Examiner*—Jack W. Keith
*Assistant Examiner*—Chuong P Nguyen
(74) *Attorney, Agent, or Firm*—Antonelli, Terry, Stout & Kraus, LLP.

(57) ABSTRACT

In a power steering device employing a hydraulic power cylinder, a motor-driven pump, and a driving power source for the motor, a power steering control system is configured to electrically connected to at least the motor and the power source for controlling a driving state of the motor and a power source voltage of the power source. The power steering control system includes a motor control circuit that generates a motor driving signal, whose command signal value is determined based on a steering assist force applied through the power cylinder to steered road wheels, a booster circuit that boosts the power source voltage, a motor angular acceleration detection circuit that detects or estimates a motor angular acceleration, and a booster-circuit control circuit that controls, responsively to the motor angular acceleration, switching between operating and non-operating states of the booster circuit.

6 Claims, 12 Drawing Sheets

FOREIGN PATENT DOCUMENTS

| | | | |
|---|---|---|---|
| DE | 102004044728 | | 4/2005 |
| GB | 2233293 | * | 1/1991 |
| JP | 2003-33077 A | | 1/2003 |
| JP | 2003-137117 | | 5/2003 |
| JP | 2003-137117 A | | 5/2003 |

* cited by examiner

STEERING TORQUE

MOTOR SPEED (MOTOR ANGULAR VELOCITY ωm)

MOTOR DRIVING CURRENT

FLUID PRESSURE GENERATED BY PUMP

STEERING ANGLE θ

MOTOR ANGULAR ACCELERATION αm

POWER STEERING DEVICE

TECHNICAL FIELD

The present invention relates to a power steering device, and specifically to a hydraulic power cylinder equipped power steering device enabling steering assist force application by operating a hydraulic power cylinder by means of a motor-driven pump.

BACKGROUND ART

A power steering device disclosed in Japanese Patent Provisional Publication No. 2003-137117 (hereinafter is referred to as "JP2003-137117") is generally known as this type of power steering device. The power steering device disclosed in JP2003-137117 is comprised of an output shaft linked to the lower end of a steering shaft, a rack-and-pinion mechanism installed on the lower end of the output shaft for steering of steered road wheels, a hydraulic power cylinder linked to the rack of the rack-and-pinion mechanism, and a motor-driven reversible pump provided for selectively supplying working fluid into the first cylinder chamber arranged as the left-hand half of the power cylinder or into the second cylinder chamber arranged as the right-hand half of the power cylinder. When a normal steering operation is made by means of a steering wheel for left or right turns during vehicle driving, for the purpose of steering assist force application, working fluid (hydraulic pressure or working pressure) is selectively supplied to either one of the first and second hydraulic cylinder chambers by way of normal rotation or reverse rotation of the motor-driven reversible pump. As compared to an electric power steering device that a steering shaft is driven directly by means of an actuator (an electric motor), for the same size and type of electric motor, the hydraulic power cylinder equipped power steering device can produce a comparatively great steering assist force.

However, in recent years, owing to the expansion of power-steering-device equipped vehicles, a greater steering assist force is required. Thus, a further rise in motor power output has come to be required. For the further motor power output rise, Japanese Patent Provisional Publication No. 2003-33077 (hereinafter is referred to as "JP2003-33077"), corresponding to U.S. Pat. No. 6,987,371, teaches the use of a booster circuit that boosts a source voltage of a driving power source for a motor connected to a steering system. JP2003-33077 also teaches a steering controller that controls a source-voltage boost timing based on a rotational speed of the motor. The motor-speed dependent source-voltage boost timing control contributes to a reduction in the frequency of executions of boost operation, thus ensuring the reduced electric power consumption of the car battery.

SUMMARY OF THE INVENTION

However, the hydraulic power cylinder equipped power steering device disclosed in JP2003-137117 is constructed, so that working fluid is pressurized by rotation of the motor-driven reversible pump and the power cylinder is operated by the working fluid pressure produced by the pump.

Thus, the power steering device of JP2003-137117 has a motor-speed versus working-fluid-pressure characteristic that the motor speed is fast until the working fluid pressure reaches a predetermined pressure level and the motor speed drops after the predetermined pressure level has been reached. In the case of the aforementioned motor-speed versus working-fluid-pressure characteristic, a time rate of change in motor speed is very high, until the working fluid pressure reaches the predetermined pressure level. Suppose that the actual rate of change in motor speed is less than a desired value while the predetermined pressure level has not yet been reached. Then, a lack of the actual working fluid pressure with respect to the desired fluid pressure value, in other words, a lack of steering assist would result.

Under these conditions, suppose that the motor-speed dependent source-voltage boost timing control as disclosed in JP2003-33077 is executed. Then, a response delay in a working fluid pressure rise would result while a motor speed threshold value has not yet been reached. In such a case, even if the boost operation starts from the boost timing when the motor speed has reached its threshold value, it is impossible to ensure a desired fluid-pressure control responsiveness (i.e., a desired steering assist control responsiveness) and thus it is difficult to quickly precisely bring the actual working fluid pressure closer to a desired value. Also, a motor speed change needed after the start of boost operation differs depending on a pressure level of working fluid pressure produced when the motor speed threshold value has been reached. Therefore, in the case of a rapid motor speed rise, there is a possibility of an inadequate boost operation for the source voltage and/or unnecessary executions of boost operation. To avoid this, it is possible to set the motor speed threshold value, at which the boost operation starts, to a low value. However, superfluously the boost operation may be executed, due to the setting of the motor speed threshold to the low value, thus resulting in the undesirably increased frequency of operation of the booster circuit. This leads to the problem of the increased car-battery burden.

It is, therefore, in view of the previously-described disadvantages of the prior art, an object of the invention to provide a power steering device capable of achieving good steering feeling without increasing a battery burden, when applying a steering assist force by selectively supplying working fluid pressure to either one of a pair of hydraulic cylinder chambers of a hydraulic power cylinder during operation of a motor-driven pump.

In order to accomplish the aforementioned and other objects of the present invention, a power steering device comprises a hydraulic power cylinder configured to assist a steering force of a steering mechanism linked to steered road wheels, a pump that selectively supplies hydraulic pressure to either one of two hydraulic cylinder chambers defined in the power cylinder, a motor that drives the pump, a driving power source that supplies electric power to the motor, and a power steering control system configured to electrically connected to at least the motor and the driving power source for controlling a driving state of the motor and a power source voltage of the driving power source, the power steering control system comprising a motor control circuit that generates a motor driving signal, whose command signal value is determined based on a steering assist force applied through the power cylinder to the steered road wheels, a booster circuit that boosts the power source voltage of the driving power source, a motor angular acceleration detection circuit that detects or estimates a motor angular acceleration, and a booster-circuit control circuit that controls, responsively to the motor angular acceleration, switching between operating and non-operating states of the booster circuit.

According to another aspect of the invention, a power steering device comprises a hydraulic power cylinder configured to assist a steering force of a steering mechanism linked to steered road wheels, a pump having a pair of ports through which hydraulic pressure is supplied via first and second fluid lines to respective hydraulic cylinder chambers defined in the power cylinder, a motor capable of driving the pump in a normal-rotational direction and in a reverse-rotational direction, a driving power source that supplies electric power to the motor, and a power steering control system configured to electrically connected to at least the motor and the driving power source for controlling a driving state of the motor and a power source voltage of the driving power source, the power steering control system comprising a motor control circuit that generates a motor driving signal, whose command signal value is determined based on a steering assist force applied through the power cylinder to the steered road wheels, a booster circuit that boosts the power source voltage of the driving power source, a motor angular acceleration detection circuit that detects or estimates a motor angular acceleration, and a booster-circuit control circuit that controls, responsively to the motor angular acceleration, switching between operating and non-operating states of the booster circuit.

According to a further aspect of the invention, a power steering device comprises a hydraulic power cylinder configured to assist a steering force of a steering mechanism linked to steered road wheels, a pump that selectively supplies hydraulic pressure to either one of two hydraulic cylinder chambers defined in the power cylinder, a motor that drives the pump, a driving power source that supplies electric power to the motor, and a power steering control system configured to electrically connected to at least the motor and the driving power source for controlling a driving state of the motor and a power source voltage of the driving power source, the power steering control system comprising a motor control circuit that generates a motor driving signal, whose command signal value is determined based on a steering assist force applied through the power cylinder to the steered road wheels, a booster circuit that boosts the power source voltage of the driving power source, a motor angular acceleration detection circuit that detects or estimates a motor angular acceleration, and a booster-circuit control circuit that switches on the booster circuit, when the motor angular acceleration becomes greater than or equal to a motor-angular-acceleration threshold value.

According to a still further aspect of the invention, a power steering device comprises a hydraulic power cylinder configured to assist a steering force of a steering mechanism linked to steered road wheels, a pump that selectively supplies hydraulic pressure to either one of two hydraulic cylinder chambers defined in the power cylinder, a motor that drives the pump, a driving power source that supplies electric power to the motor, and a power steering control system configured to electrically connected to at least the motor and the driving power source for controlling a driving state of the motor and a power source voltage of the driving power source, the power steering control system comprising a torque sensor that detects steering torque acting on the steering mechanism, a motor control circuit that generates a motor driving signal, whose command signal value is determined based on the steering torque, a booster circuit that boosts the power source voltage of the driving power source, a steering torque rate-of-change estimation circuit that calculates or estimates a steering torque rate-of-change as a rate of change of the steering torque with respect to time, and a booster-circuit control circuit that controls, responsively to the steering torque rate-of-change, switching between operating and non-operating states of the booster circuit.

According to the another aspect of the invention, a power steering device comprises a steering shaft fixedly connected to a steering wheel, a hydraulic power cylinder installed on a steering mechanism linking the steering shaft to steered road wheels, a pump that selectively supplies hydraulic pressure to either one of two hydraulic cylinder chambers defined in the power cylinder, a motor that drives the pump, a driving power source that supplies electric power to the motor, and a power steering control system configured to electrically connected to at least the motor and the driving power source for controlling a driving state of the motor and a power source voltage of the driving power source, the power steering control system comprising a motor control circuit that generates a motor driving signal, whose command signal value is determined based on a steering assist force applied through the power cylinder to the steered road wheels, a steering angle sensor that detects a steering angle corresponding to an angular displacement of the steering wheel measured from a straight-ahead position, a booster circuit that boosts the power source voltage of the driving power source, a steering-wheel angular acceleration calculation circuit that calculates or estimates a steering-wheel angular acceleration based on the steering angle, and a booster-circuit control circuit that controls, responsively to the steering-wheel angular acceleration, switching between operating and non-operating states of the booster circuit.

According to another aspect of the invention, a power steering device comprises a hydraulic power cylinder configured to assist a steering force of a steering mechanism linked to steered road wheels, a pump that selectively supplies hydraulic pressure to either one of two hydraulic cylinder chambers defined in the power cylinder, a motor that drives the pump, a driving power source that supplies electric power to the motor, and a power steering control system configured to electrically connected to at least the motor and the driving power source for controlling a driving state of the motor and a power source voltage of the driving power source, the power steering control system comprising a motor control circuit that generates a pulse-width modulated (PWM) duty-cycle signal of a duty cycle value for the motor, the PWM duty-cycle signal being determined based on a steering assist force applied through the power cylinder to the steered road wheels, a booster circuit that boosts the power source voltage of the driving power source, a PWM duty-cycle signal rate-of-change calculation circuit that calculates or estimates a PWM duty-cycle signal rate-of-change as a rate of change of the duty cycle value of the PWM duty-cycle signal with respect to time, and a booster-circuit control circuit that controls, responsively to the PWM duty-cycle signal rate-of-change, switching between operating and non-operating states of the booster circuit.

According to another aspect of the invention, a power steering device comprises a hydraulic power cylinder configured to assist a steering force of a steering mechanism linked to steered road wheels, a pump that selectively supplies hydraulic pressure to either one of two hydraulic cylinder chambers defined in the power cylinder, a motor that drives the pump, a driving power source that supplies electric power to the motor, and a power steering control system configured to electrically connected to at least the motor and the driving power source for controlling a driving state of the motor and a power source voltage of the driving power source, the power steering control system comprising a motor control circuit that generates a motor driving signal, whose command signal value is determined based on a steering assist force applied through the power cylinder to the steered road wheels, a motor-current detection circuit that detects an actual current value flowing across the motor, a booster circuit that boosts the power source voltage of the driving power source, an electric-current-value deviation calculation circuit that calculates a deviation between the command signal value and the actual current value, and a booster-circuit control circuit that switches on the booster circuit, when the deviation becomes greater than or equal to a deviation threshold value.

According to another aspect of the invention, a power steering device comprises a hydraulic power cylinder configured to assist a steering force of a steering mechanism linked to steered road wheels, a pump that selectively supplies hydraulic pressure to either one of two hydraulic cylinder chambers defined in the power cylinder, a motor that drives the pump, a driving power source that supplies electric power to the motor, and a power steering control system configured to electrically connected to at least the motor and the driving power source for controlling a driving state of the motor and a power source voltage of the driving power source, the power steering control system comprising a motor control circuit that generates a motor driving signal, whose command signal value is determined based on a steering assist force applied through the power cylinder to the steered road wheels, a booster circuit that boosts the power source voltage of the driving power source, a booster-circuit control circuit that controls switching between operating and non-operating states of the booster circuit, and the booster-circuit control circuit switching on the booster circuit, when it is determined that there is a possibility of a response delay of hydraulic pressure supplied from the pump to the power cylinder.

The other objects and features of this invention will become understood from the following description with reference to the accompanying drawings.

DESCRIPTION OF THE PREFERRED EMBODIMENTS

First Embodiment

Figure 1:
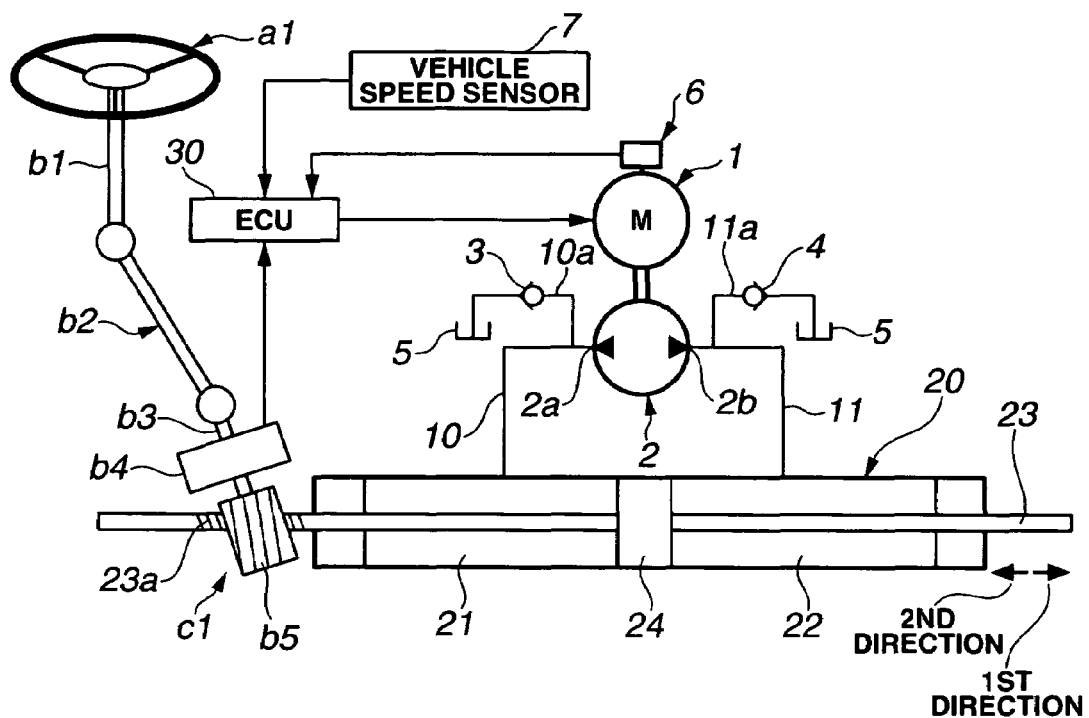
FIG. 1 is a system diagram illustrating the first embodiment of a power steering device.

Referring now to the drawings, particularly to FIG. 1, the power steering device of the first embodiment is exemplified in an automotive vehicle with left and right steered road wheels (not shown). As clearly shown in FIG. 1, a steering wheel a1 is fixedly connected to the top of a steering shaft b1. The upper end of an intermediate shaft b2 is mechanically linked via a universal joint (not numbered) to the lower end of steering shaft b1. The upper end of a pinion shaft b3 is mechanically linked via a universal joint (not numbered) to the lower end of intermediate shaft b2. A torque sensor b4 is installed on or attached to pinion shaft b3, for detecting the magnitude and direction of torque acting between steering wheel a1 and each of the steered road wheels, substantially corresponding to the magnitude and direction of steering torque (steering wheel torque) applied to steering wheel a1 about its axis of rotation by the driver. The torque, detected by torque sensor b4, is hereinafter referred to as "steering torque Ts". A pinion b5 is fixedly connected onto the lower end of pinion shaft b3. A rack-and-pinion mechanism c1 is comprised of a rack 23a of a rack shaft 23 (described later) and pinion b5. Pinion b5 meshes with rack 23a of rack shaft 23, which is the major cross member of the steering linkage. Rack-and-pinion mechanism c1 serves as a rotary-to-linear motion converter that converts rotary motion of steering wheel a1 into linear motion of rack shaft 23. Rack-and-pinion mechanism c1 also constructs a part of a steering mechanism linked to the steered road wheels.

Both ends of rack shaft 23 are mechanically linked via tie rods (not shown) and steering knuckles (not shown) to the respective steered road wheels (now shown). Rack shaft 23 is installed in a hydraulic power cylinder 20 in such a manner as to extend in the axial direction of power cylinder 20. In other words, power cylinder 20 is installed on the rack-and-pinion mechanism c1 (the steering mechanism). A piston 24 is also located in power cylinder 20 and installed substantially at a midpoint of rack shaft 23 so that piston 24 is movable together with rack shaft 23. As can be seen from the system diagram of FIG. 1, an internal space of power cylinder 20 is divided into a first cylinder chamber 21 defined on the left-hand face of piston 24 (viewing FIG. 1) and a second cylinder chamber 22 defined on the right-hand face of piston 24. First cylinder chamber 21 serves to assist axial movement of rack shaft 23 in a first direction, that is, the rightward rack-shaft movement (viewing FIG. 1). On the other hand, second cylinder chamber 22 serves to assist axial movement of rack shaft 23 in a second direction, that is, the leftward rack-shaft movement. That is, power cylinder 20 assists the steering force transmitted through the steering mechanism including rack-and-pinion mechanism c1 linked to the steered road wheels.

A motor 1 included in the power steering device is a brushless motor, which can rotate in a reverse-rotational direction and in a normal-rotational direction. A motor rotation angle sensor 6 is attached to motor 1 (exactly, a rotor of the brushless motor) for detecting a rotation angle θm of the motor rotor of motor 1, in other words, the angular position of the brushless-motor rotor, and for generating a signal indicative of the motor rotation angle θm. Motor 1 is operated from a three-phase circuit having a U phase, a V phase, and a W phase. The three-phase circuit is energized by voltages that differ in phase by one-third of a cycle. That is, motor 1 is driven by supplying voltages through a switching circuit (included in a motor drive circuit 51 described later in reference to FIG. 2) to the three-phase circuit having the U, V, and W phases, depending on the rotation angle of motor 1. As a rotation angle sensor (or an angular position sensor), that is, motor rotation angle sensor 6, a resolver, an absolute-valued angular resolver, a plurality of Hall elements circumferentially spaced apart from each other and placed in a magnetic field of the motor and operating on the Hall-effect principle, a rotary encoder, or the like may be used. The use of the angular position sensor (motor rotation angle sensor 6) eliminates the necessity of an expensive angular velocity sensor or an expensive angular acceleration sensor. The motor shaft, that is, the output shaft of motor 1 is connected to a reversible pump 2, in which the direction of discharge of pressurized working fluid can be reversed or switched depending on the rotational direction of the motor shaft. Reversible pump 2 has a first port 2a serving as an inlet-and-outlet port and a second port 2b serving as an inlet-and-outlet port.

First port 2a is connected to first cylinder chamber 21 via a first fluid line 10, whereas second port 2b is connected to second cylinder chamber 22 via a second fluid line 11. A first branch line 10a is connected to first fluid line 10. First branch line 10a is also connected via first check valve 3 to a reservoir tank 5. In a similar manner, a second branch line 11a is connected to second fluid line 11. Second branch line 11a is also connected via a second check valve 4 to reservoir tank 5. First check valve 3 is disposed in first branch line 10a to permit only the free flow of working fluid from reservoir tank 5 into first fluid line 10. Second check valve 4 is disposed in second branch line 11a to permit only the free flow of working fluid from reservoir tank 5 into second fluid line 11.

Figure 2:
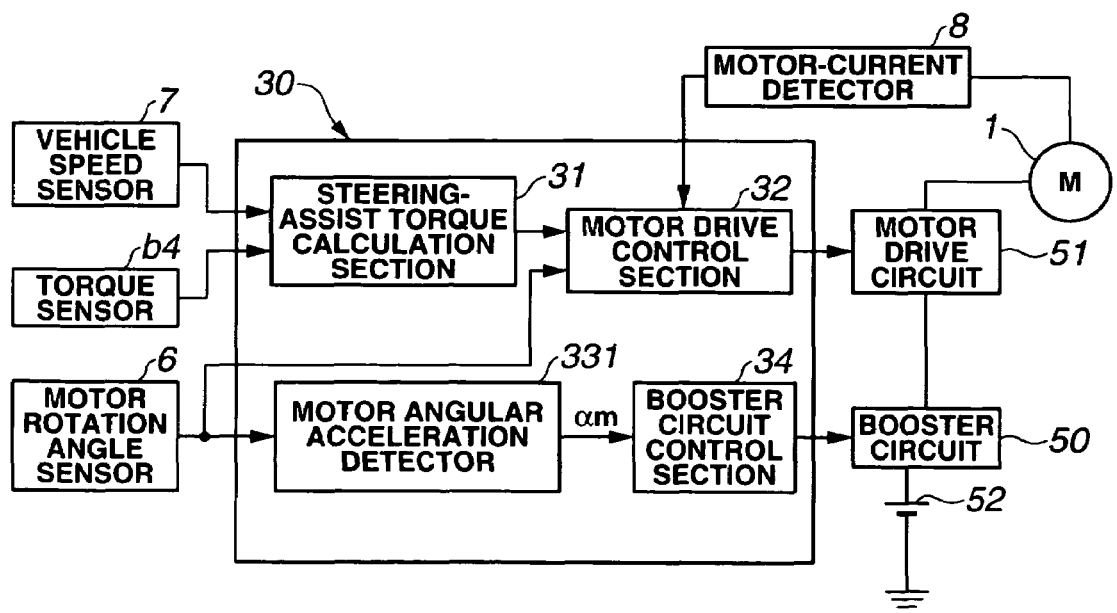
FIG. 2 is a block diagram showing the input section (the input circuitry), the control section (the control circuitry), and the output section (the output circuitry) of a controller incorporated in the power steering device of the first embodiment.

As shown in FIGS. 1 and 2, a controller (an electronic control unit), which is provided for controlling motor 1 included in the power steering control system, generally comprises a microcomputer. Controller 30 includes an input/output interface (I/O), memories (RAM, ROM), and a microprocessor or a central processing unit (CPU). The input/output interface (I/O) of controller 30 receives input information from various engine/vehicle sensors, namely torque sensor b4, motor rotation angle sensor 6, a vehicle speed sensor 7, and a motor-current detector (motor-current detection circuit) 8. Vehicle speed sensor 7 tells the controller at what speed the vehicle is moving and generates a signal indicative of vehicle speed VSP. Motor-current detector 8 is provided to detect a current value Im of electric current (motor driving current) applied to reversible motor 1. Within controller 30, the central processing unit (CPU) allows the access by the I/O interface of input informational data signals from the previously-discussed engine/vehicle sensors b4, 6, 7, and 8. The CPU of controller 30 is responsible for carrying the control programs stored in memories and is capable of performing necessary arithmetic and logic operations for boost control (described later) and for motor drive control (described later). Computational results (arithmetic calculation results), that is, calculated output signals are relayed through the output interface circuitry of controller 30 via a booster circuit 50 and/or motor drive circuit 51 to an output stage, namely, motor 1. The details of booster circuit 50 and motor drive circuit 51 are hereunder described in reference to the block diagram of FIG. 2.

Referring now to FIG. 2, the processor of controller 30 includes a steering-assist torque arithmetic calculation section (a steering-assist torque calculation circuit or steering-assist torque calculation means) 31 that calculates a desired steering-assist torque (or a desired steering-assist amount) based on sensor signals from vehicle speed sensor 7 and torque sensor b4. The processor of controller 30 also includes a motor drive control section, simply, a motor control circuit (motor control means) 32 that outputs a control command signal to motor drive circuit 51 by way of servo control based on both an actual motor current value Im detected by motor-current detector 8 and the desired steering-assist torque calculated by steering-assist torque arithmetic calculation section 31, in a manner so as to achieve the calculated desired steering-assist torque and thus to bring the actual steering-assist torque closer to the desired steering-assist torque. The processor of controller 30 also includes a motor angular acceleration detector (a motor angular acceleration detection circuit) 331 that detects or determines or estimates an angular acceleration αm of a motor rotor of motor 1 based on the motor rotation angle indicative signal from motor rotation angle sensor 6. Furthermore, the processor of controller 30 includes a booster circuit control section (a booster-circuit control circuit or booster circuit control means) 34 that controls the drive (switching between operating and non-operating states) of booster circuit 50 based on the motor angular acceleration αm detected by motor angular acceleration detector 331.

Booster circuit 50 is provided for boosting or rising a power source voltage (a power supply voltage) of a driving power source, such as a car battery 52, for reversible motor 1, and for supplying the boost-up battery voltage to motor drive circuit 51. As shown in FIG. 2, booster circuit 50 is constructed as a peripheral circuit or an external circuit, which is provided outside of the controller. In lieu thereof, booster circuit 50 may be integrally installed in the controller as an internal circuit.

Motor drive circuit 51 is comprised of the switching circuit that supplies electric power to motor 1 to achieve both of a desired motor speed and a desired motor torque. Switching control is made to motor drive circuit 51 by means of motor drive control section 32, for controlling the driving state of motor 1.

Figure 3:
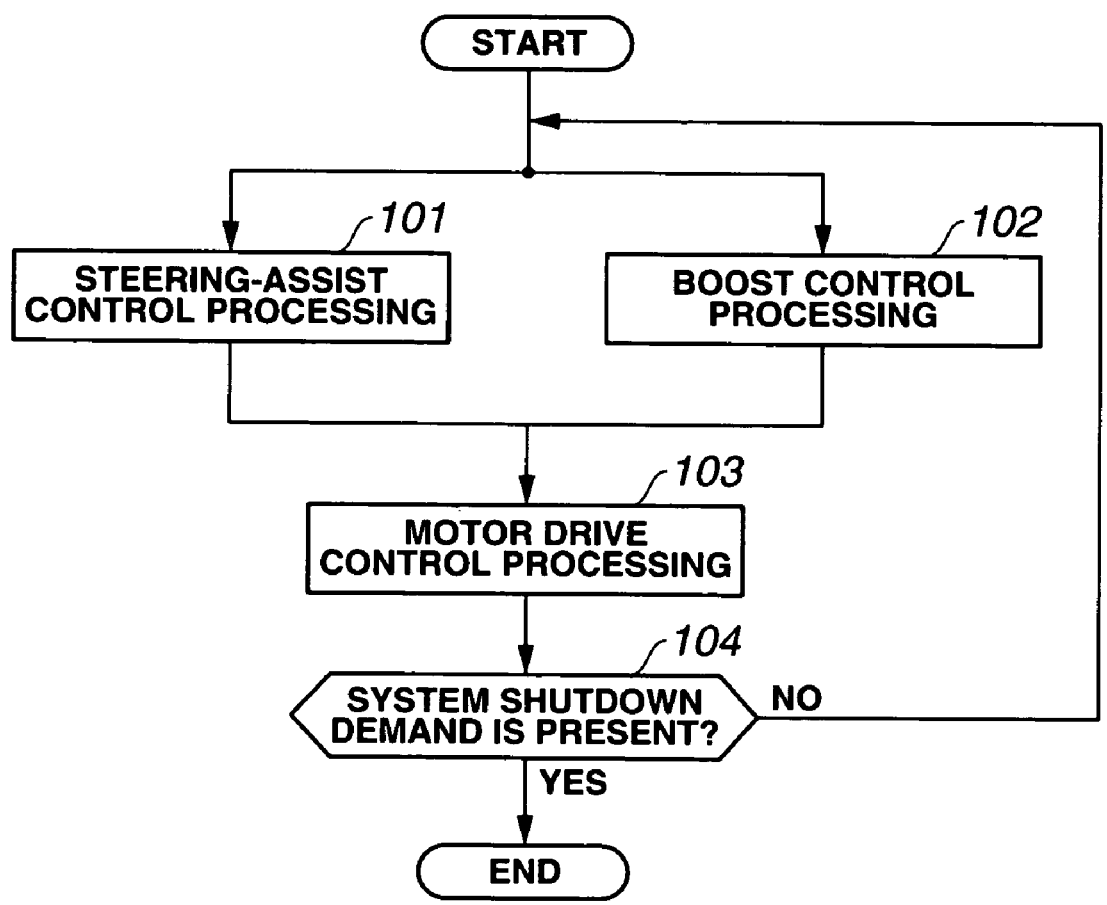
FIG. 3 is a flow chart showing a control routine executed within the controller of the power steering device of the first embodiment.

Referring to FIG. 3, there is shown the power steering system control routine executed within controller 30 incorporated in the power steering device of the first embodiment. The control routine is executed as time-triggered interrupt routines to be triggered every predetermined time intervals such as 10 milliseconds.

At step 101, steering-assist control processing (or steering-assist torque arithmetic processing) is executed. In parallel with the steering-assist control processing of step 101, at step 102 boost control processing is executed. The steering-assist control processing (or the steering-assist torque arithmetic processing) executed at step 101 includes an arithmetic operation for calculating or determining the desired steering-assist torque by means of steering-assist torque arithmetic calculation section 31. In a conventional manner, the desired steering-assist torque is suitably calculated or determined so that the driver-applied steering torque is brought closer to a desired value. The method of suitably calculating the desired steering-assist torque is conventional and forms no part of the present invention. Thus, the details of the method to calculate the desired steering-assist torque are omitted.

At step 103, motor drive control processing is executed. The motor drive control processing means servo-control processing executed by motor drive control section 32. Concretely, a desired motor driving current value (or a desired motor driving signal value) for motor 1 is set or determined based on the desired steering-assist torque calculated by steering-assist torque calculation section 31, in a manner so as to achieve the desired steering-assist torque. Then, a control command signal is generated from motor drive control section 32 to motor drive circuit 51, so that the actual current value Im of electric current flowing through motor 1 is brought closer to the desired motor driving current value.

At step 104, a check is made to determine whether a system shutdown demand for the power steering control system is present or absent. In the absence of the system shutdown demand, steps 101, 102, and 103 are repeatedly executed. Conversely in the presence of the system shutdown demand, one cycle of the control routine terminates. For instance, when the power steering control system is normally operating, the system shutdown demand corresponds to an ignition-switch turned-OFF state. In contrast, in the presence of a failure in the power steering control system, such as a control signal line failure, the processor of controller 30 determines, based on the output of a system-failure signal, that the system shutdown demand is satisfied.

Figure 4:
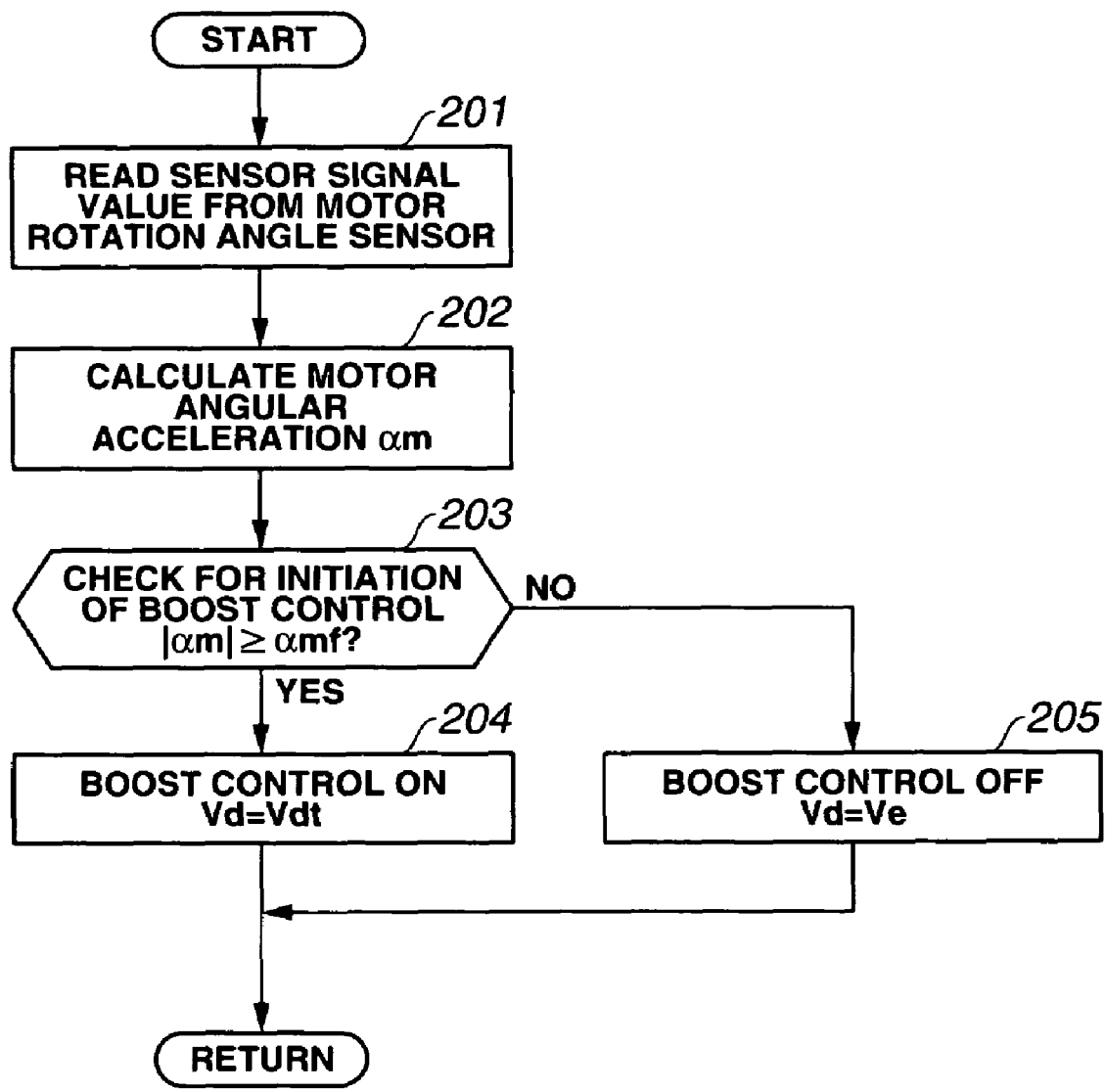
FIG. 4 is a flow chart showing control actions of a motor angular acceleration detector and a booster circuit control section included in the power steering control system for the power steering device of the first embodiment.

Referring now to FIG. 4, there is shown the subroutine executed within motor angular acceleration detector 331 and booster circuit control section 34 of controller 30 incorporated in the power steering device of the first embodiment. The subroutine is executed as time-triggered interrupt routines to be triggered every predetermined time intervals such as 10 milliseconds.

At step 201, motor rotation angle $\theta m$ is read. Concretely, motor rotation angle $\theta m$ is determined based on the latest up-to-date informational data signal from motor rotation angle sensor 6.

At step 202, motor angular acceleration $\alpha m$ is arithmetically calculated based on motor rotation angle $\theta m$. Concretely, motor angular acceleration $\alpha m$ is arithmetically calculated as the second-order derivative $d^2\theta m/dt^2$ of motor rotation angle $\theta m$ (i.e., as the second-order derivative of angular displacement of the motor rotor of motor 1). More concretely, a motor angular velocity $\omega m$ is, first, calculated as a rate of change of an angular displacement (i.e., motor rotation angle $\theta m$) of the motor rotor with respect to a unit time t. That is, motor angular velocity $\omega m$ is represented by the derivative $d\theta m/dt$, which is the rate of change of motor rotation angle $\theta m$ with respect to time. Second, motor angular acceleration $\alpha m$ is calculated as a rate of change of motor angular velocity $\omega m$ ($=d\theta m/dt$) with respect to time. That is, motor angular acceleration $\alpha m$ is represented by the equation $\alpha m = d\omega m/dt = d^2\theta m/dt^2$.

At step 203, in order to determine whether boost control, through which the source voltage of the driving power source (battery 52) for motor 1 is boosted and the boost-up battery voltage is supplied to motor drive circuit 51, is enabled (initiated) or disabled (disengaged), a check is made to determine whether the absolute value $|\alpha m|$ of motor angular acceleration $\alpha m$, calculated through steps 201-202, is greater than or equal to a motor angular acceleration threshold value (a fixed threshold value) $\alpha mf$. When the answer to step 203 is in the affirmative (YES), that is, in case of $|\alpha m| \geq \alpha mf$, the routine proceeds from step 203 to step 204. Conversely when the answer to step 203 is in the negative (NO), that is, in case of $|\alpha m| < \alpha mf$, the routine proceeds from step 203 to step 205. Having compared the absolute value $|\alpha m|$ of motor angular acceleration $\alpha m$ to its threshold value $\alpha mf$ corresponds to normal rotation and reverse rotation of motor 1. Motor angular acceleration threshold value $\alpha mf$ means a critical value above which there is an increased tendency for the driver-applied steering torque to exceed a desired value due to a lack of steering assist.

At step 204, boost control becomes enabled (ON). In other words, booster circuit 50 becomes switched ON for initiating boost operation. A booster voltage Vd outputted from booster circuit 50 is risen or boosted up to a desired boost-up voltage (a fixed voltage value) Vdt, that is, Vd=Vdt.

At step 205, boost control becomes disabled (OFF) or remains disabled. In other words, booster circuit 50 becomes switched OFF or remains switched OFF for disabling boost operation. Power source voltage Ve is outputted from booster circuit 50 as it is, that is, Vd=Ve.

[Fundamental Power Steering Control Action]

The fundamental control action executed by the power steering control system is hereinafter described in detail.

After the ignition switch is turned ON, a driving current (or a motor driving signal), determined based on at least the sensor signal (steering torque Ts) from torque sensor b4, is supplied to motor 1. Motor 1 generates torque (motor torque Tm described later) substantially corresponding to the driving current supplied to the motor, and then pump 2 is driven by motor 1. Thus, pump 2 discharges pressurized working fluid of a flow rate corresponding to the motor speed.

For instance, assuming that the pressurized working fluid is discharged from pump 2 into first fluid line 10, the pressurized working fluid is introduced through first fluid line 10 into first cylinder chamber 21, and thus a hydraulic pressure rise of working fluid in first cylinder chamber 21 occurs. The hydraulic pressure in first cylinder chamber 21 acts as a steering assist torque (a steering assist force) of the driver-applied steering wheel torque (the driver-applied steering effort or the driver-applied steering force). The resultant force of the driver-applied steering force and the steering assist force produced by means of hydraulic power cylinder 20 permits the rightward movement of rack shaft 23 in the first direction (viewing FIG. 1) against the load resistance, mainly created owing to friction between each of the steered road wheels and the road surface. In this manner, the steered road wheels can be steered. During the steering assist operation, piston 24 moves together with the rightward displacement of rack shaft 23, and as a result the volume of first cylinder chamber 21 increases, while the volume of second cylinder chamber 22 reduces. Working fluid exhausted by reduction of the volume of second cylinder chamber 22 returns through second fluid line 11 to the second port 2b of pump 2. The working fluid returned to pump 2 is supplied again to first cylinder chamber 21 whose volume is increasing. As discussed above, the power steering device of the first embodiment is constructed so that steering wheel a1 and motor 1 are connected or linked to each other via working fluid. In other words, steering wheel a1 and motor 1 are connected or linked to each other via an integral element (hydraulic power cylinder 20). Hydraulic power cylinder 20 serves as the integral element, since a volume change of each of first and second cylinder chambers 21-22 of power cylinder 20 is achieved by movement of working fluid produced by rotation of motor 1. Therefore, a desired steering assist characteristic will not be able to be provided without rotating motor 1 faster than rotation of steering wheel a1.

[Basic Motor Characteristic]

Figure 5:
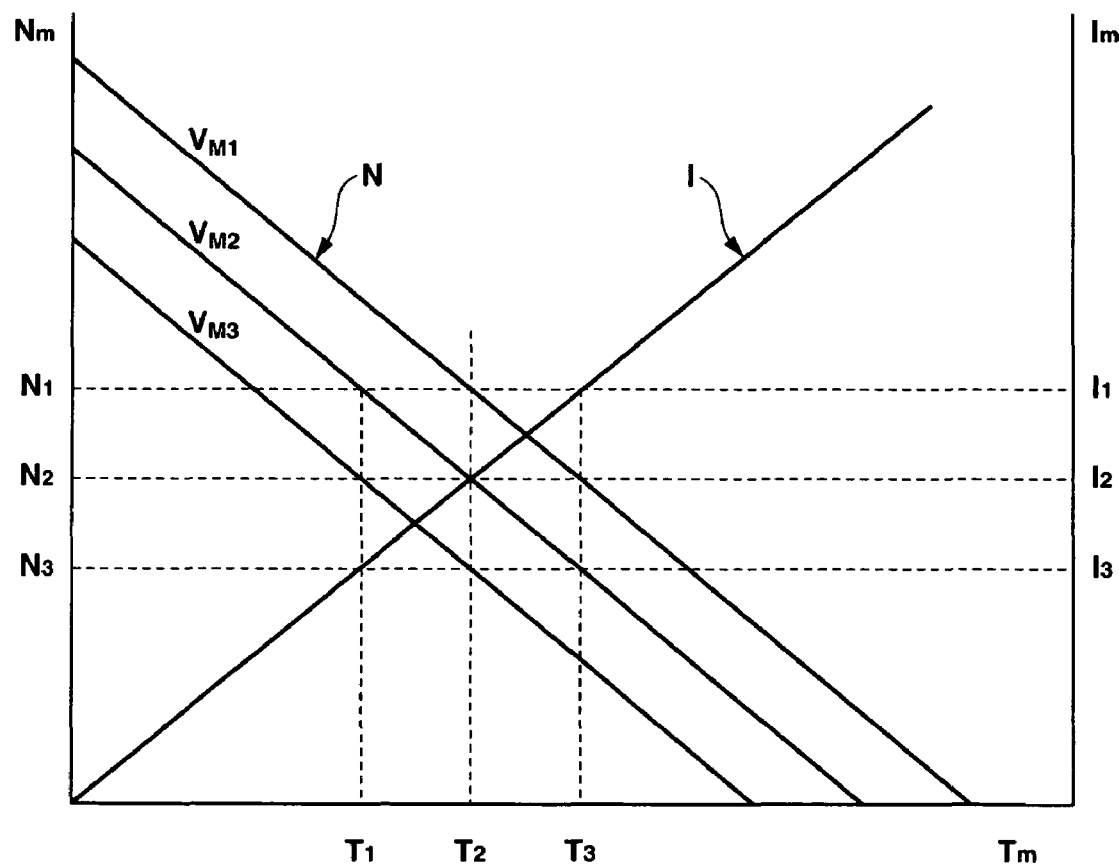
FIG. 5 is a characteristic diagram showing a basic motor characteristic.

Referring to FIG. 5, there is shown the basic motor characteristic of motor 1. In FIG. 5, the axis of abscissa represents a motor torque Tm, the axis of ordinate of the left-hand side represents a motor speed Nm, and the axis of ordinate of the right-hand side represents a motor current (actual motor current Im). $V_{M1}$, $V_{M2}$, and $V_{M3}$ denote three different voltages applied to motor 1. In FIG. 5, the magnitude relation of these voltages $V_{M1}$, $V_{M2}$, and $V_{M3}$ is defined by the inequality $V_{M1} > V_{M2} > V_{M3}$. As can be appreciated from the motor characteristics of FIG. 5 relating to the three different applied motor voltages $V_{M1}$, $V_{M2}$, and $V_{M3}$, for a certain applied voltage value, motor speed Nm and motor torque Tm are in inverse proportion to each other owing to the occurrence of counter electromotive force. Thus, under a constant voltage applied to the motor, motor speed Nm tends to reduce, as motor torque Tm increases. For the same applied voltage, conversely when motor speed Nm increases, motor torque Tm tends to drop.

When motor speed Nm is a speed value $N_2$ under the applied voltage $V_{M2}$, motor torque Tm becomes a torque value $T_2$, while motor current Im becomes a current value $I_2$. Under these conditions, when increasing motor speed Nm from the speed value $N_2$ to a speed value $N_1$, owing to an increase in counter electromotive force motor current Im tends to reduce from the current value $I_2$ to a current value $I_1$, while motor torque Tm also tends to reduce from the torque value $T_2$ to a torque value $T_1$. That is, assuming that motor speed Nm is risen when the steering assist force corresponding to the torque value $T_2$ is required, motor torque Tm cannot be maintained at the torque value $T_2$. In such a case, motor torque Tm tends to fall to a level less than the torque value $T_2$. For the reasons discussed above, in order to increase motor speed Nm while remaining motor torque Tm unchanged (Tm=$T_2$), under a specified condition where motor speed Nm is the speed value $N_2$ and motor torque Tm is the torque value $T_2$, the motor voltage applied to motor 1 is risen or boosted up from the voltage value $V_{M2}$ to a voltage value $V_{M1}$. Even if the counter electromotive force occurs, by virtue of the boosted-up motor voltage from $V_{M2}$ to $V_{M1}$ it is possible to increase motor current Im from the current value $I_2$ to the current value $I_1$. Thus, it is possible to increase motor speed Nm up to the speed value $N_1$, while maintaining motor torque Tm at the torque value $T_2$. If it is going to maintain motor speed Nm at the speed value $N_2$ when the motor voltage drops from the voltage value $V_{M2}$ to the voltage value $V_{M3}$, motor torque Tm will fall to the torque value $T_1$. Even in such a case, it is possible to maintain both of motor speed Nm and motor torque Tm respectively at the speed value $N_2$ and the torque value $T_2$, by rising or boosting up the motor voltage, in other words, the source voltage (the battery voltage).

[Operation of Power-Steering System Component Parts at Different Steering Velocities]

Based on the above-mentioned motor characteristic, the power steering device of the first embodiment operates at steering velocities differing from each other, as hereunder explained in reference to the time charts shown in FIGS. 6A-6F.

Figure 6A:
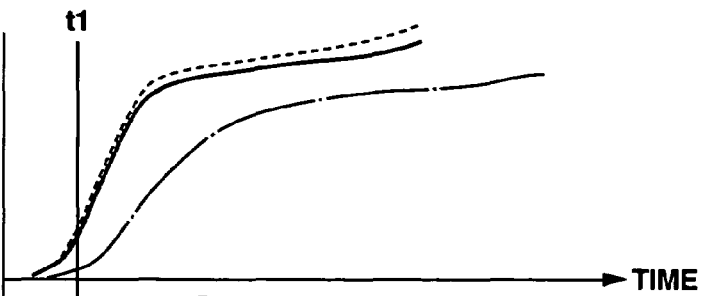
FIGS. 6A-6F are time charts explaining changes of states of power-steering system component parts of the first embodiment, such as a motor and a reversible pump, obtained at different steering velocities, that is, at fast and slow steering velocities.
Figure 6B:
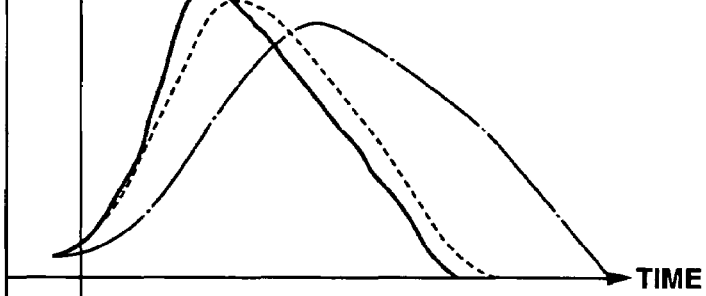
Figure 6C:
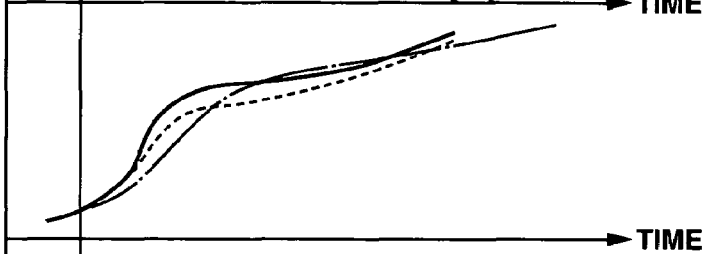
Figure 6D:
Figure 6E:
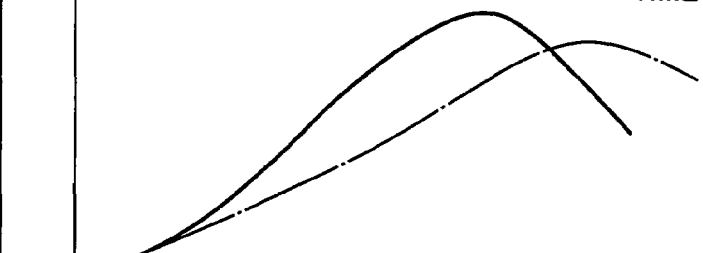
Figure 6F:
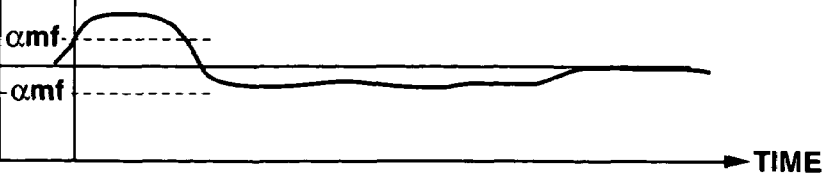

Referring now to FIGS. 6A-6B, there are shown changes of states of power-steering system component parts of the first embodiment, such as motor 1 and reversible pump 2, obtained at fast and slow steering velocities. The steering velocity is defined by a rate of change of a steering wheel angle, simply, a steering angle θ (angular displacement of steering wheel a1 measured from the straight-ahead position) with respect to time. In FIGS. 6A-6D, the changes of states of the power-steering system component parts, indicated by the broken lines, show characteristics obtained under a state where the steering velocity is fast and additionally boost control is not executed and thus power source voltage Ve is outputted from booster circuit 50 without boosting up the power source voltage, that is, Vd=Ve. In FIGS. 6A-6F, the changes of states of the power-steering system component parts, indicated by the solid lines, show characteristics obtained under a state where the steering velocity is fast and additionally boost control is executed and thus the booster voltage Vd outputted from booster circuit 50 is risen to the desired boost-up voltage Vdt, that is, Vd=Vdt. In FIGS. 6A-6E, the changes of states of the power-steering system component parts, indicated by the one-dotted lines, show characteristics obtained under a state where the steering velocity is slow and additionally boost control is not executed and thus power source voltage Ve is outputted from booster circuit 50 without boosting up the power source voltage, that is, Vd=Ve.

When the steering velocity of steering wheel a1 is low or slow, a moving speed of piston 24 is slow and thus a speed of change of the volume of each of first and second cylinder chambers 21 and 22 is slow. Working fluid can be discharged from pump 2, adequately following the speed of change of the volume of each of first and second cylinder chambers 21-22. Under this condition, there is a less tendency for the generation of working fluid pressure to be delayed. This suppresses excessive steering torque from being generated, thus enabling a smooth steering assist force to be produced.

Conversely when the steering velocity of steering wheel a1 is high or fast, a moving speed of piston 24 is fast and thus a speed of change of the volume of each of first and second cylinder chambers 21 and 22 is fast. In such a case, there is a possibility that working fluid discharged from pump 2 cannot adequately follow the speed of change of the volume of each of first and second cylinder chambers 21-22. Under this condition, there is an increased tendency for the generation of working fluid pressure (hydraulic pressure) to be delayed. This results in a lack of steering assist force. Owing to the insufficient steering assist force, a large magnitude of the driver-applied steering wheel torque must be required.

Rotary motion of motor 1 is determined by the following equation (1) of motion. In other words, angular velocity ωm of motor 1 can be determined by the following equation (1).

$$Tm = J \times d\omega m/dt + D \times \omega m + Tp \qquad (1)$$

where Tm denotes motor torque, J denotes a moment of inertia of motor 1, D denotes a damping efficient, ωm denotes motor angular velocity, dωm/dt denotes motor angular acceleration αm, and Tp denotes a pump load torque, which is a load torque acting on pump 2 and tends to increase in proportion to the working fluid pressure generated by pump 2.

As can be appreciated from the above-discussed equation (1), when the driving current is applied to motor 1 and thus motor torque Tm begins to increase by the applied driving current, motor angular acceleration dωm/dt (=αm) becomes great and motor angular velocity ωm also becomes great, since any hydraulic pressure is not yet generated by pump 2 simultaneously with the motor driving current application. Thereafter, in accordance with a rise in hydraulic pressure, pump load torque Tp tends to increase. When a difference (a deviation) between motor torque Tm and pump load torque Tp becomes small, motor angular velocity ωm tends to gradually reduce. That is, motor angular velocity ωm (i.e., motor speed) is determined based on the deviation between motor torque Tm and pump load torque Tp.

As indicated by the one-dotted lines in FIGS. 6A-6E, under a state where the steering velocity is low and boost control is not executed, a rise in motor driving current is moderate (see FIG. 6C), and therefore motor torque Tm rises moderately. Simultaneously, the moving speed of piston 24 is slow and thus there is a less risk that hydraulic pressure is generated owing to a change in motor torque Tm. And thus, motor angular acceleration dωm/dt (=αm) becomes small, and whereby it is possible to adequately assist the driver-applied steering torque.

As indicated by the broken lines in FIGS. 6A-6D, under a state where the steering velocity is high and boost control is not executed, a rise in motor driving current applied to motor 1 and a rise in motor torque Tm become fast. Simultaneously, the moving speed of piston 24 is slow and thus a delay in the generation of hydraulic pressure occurs. A deviation between motor torque Tm and pump load torque Tp becomes great, motor angular acceleration dωm/dt (=αm) becomes great, and additionally the peak value (the maximum value) of motor angular velocity ωm becomes great. Owing to the increased motor speed (the increased motor angular velocity), the counter electromotive force (the induced voltage) developed in an inductive circuit of motor 1 also becomes great. This results in a lack in motor voltage needed to flow the driving current across motor 1, because the polarity of the induced voltage is at each instant opposite that of the applied voltage of motor 1. During fast steering, a lack in motor driving current tends to arise from a rise in motor speed (a rise in motor angular velocity ωm). This results in a lack in motor torque Tm and thus a reduction in motor speed takes place. This leads to a lack in hydraulic pressure generated by pump 2. As a consequence, steering assist force becomes insufficient.

For the reasons discussed above, when a lack of steering assist force is likely to occur, power source voltage Ve is boosted up to the desired value Vdt by way of boost control (see step 204 of FIG. 4) and as a result the applied voltage to motor 1 is properly increased in such a manner as to compensate for a lack of motor speed (a lack of motor angular velocity ωm). In the power steering control system for the power steering device of the first embodiment, as a measure in case that a lack of steering assist force is likely to occur, a comparison result (|αm|≧αmf or |αm|<αmf) of the latest up-to-date informational data about motor angular acceleration dωm/dt (=αm) and its threshold value αmf is used, and the processor of controller 30 determines that a lack of steering assist force is likely to occur, when the absolute value |αm| of motor angular acceleration αm is greater than or equal to motor angular acceleration threshold value αmf. Therefore, according to the power steering control system for the power steering device of the first embodiment, as indicated by the solid lines in FIGS. 6A-6F, at a point of time t1 when the absolute value |αm| of motor angular acceleration αm exceeds its threshold value αmf, boost control becomes engaged (enabled) and booster circuit 50 becomes energized (ON), and thus it is possible to rise the motor speed (motor angular velocity ωm) up to a higher value. As a result of this, the driver-applied steering torque becomes smaller and it is possible to avoid a response delay of working fluid pressure control, in other words, a deteriorated steering assist control responsiveness. As set out above, in the power steering control system for the power steering device of the first embodiment, as a measure in case that a lack of steering assist force is likely to occur, the comparison result (|αm|≧αmf or |αm|<αmf) of the more recent motor angular acceleration dωm/dt (=αm) and its threshold value αmf is used instead of using a comparison result between a more recent motor angular velocity ωm and its threshold value ωmf. That is, boost control is not executed only by motor angular velocity ωm being high. Thus, according to the system of the first embodiment, it is possible to effectively suppress a fall in durability of booster circuit 50 occurring owing to unnecessary boost operations, and also to ensure the reduced electric power consumption of battery 52.

Also, in the power steering device of the first embodiment that the energizing operation for motor 1 is stopped during non-steering operation, and a driving state of motor 1, that is, the direction of rotation of motor 1, motor torque and motor speed, can be controlled depending on a demand for steering assist during steering, it is necessary to rise the motor speed (motor angular velocity ωm) from zero motor speed (ωm=0) up to its maximum motor speed value at a stretch. When the motor speed must be risen at a stretch, it is very advantageous to be able to detect a demand for a motor speed rise based on motor angular acceleration dωm/dt (=ωm) at the earlier timing.

Second Embodiment

Figure 7:
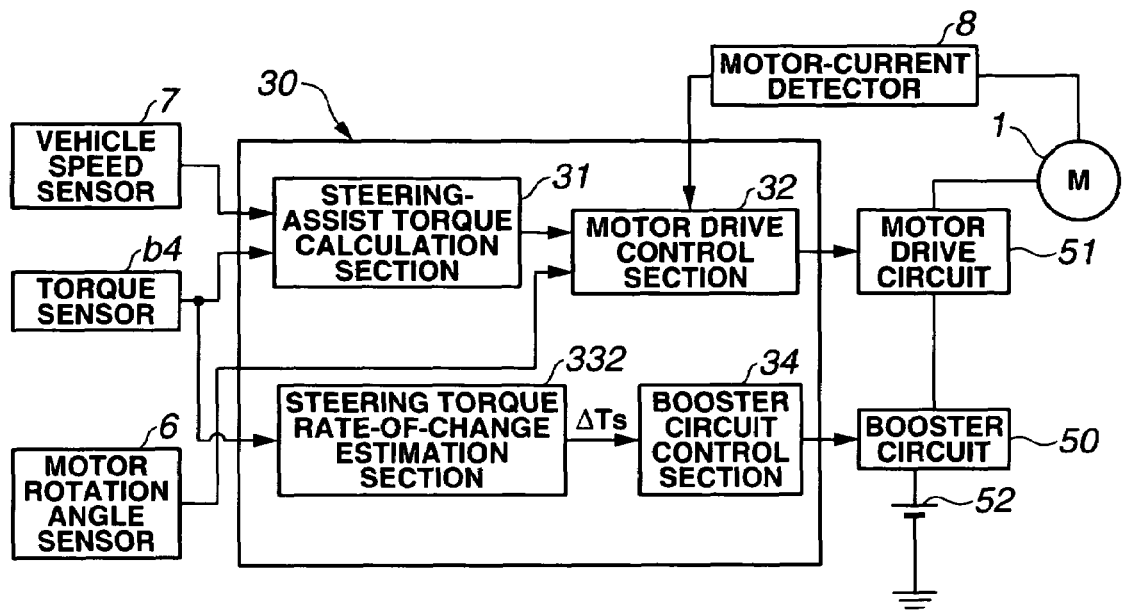
FIG. 7 is a block diagram showing the input section, the control section, and the output section of a controller incorporated in the power steering device of the second embodiment.

Referring now to FIG. 7, there is shown the detailed configuration of the control system of the power steering device of the second embodiment. As can be appreciated from comparison of the block diagrams shown in FIGS. 2 and 7, the configuration of the control system of the power steering device of the second embodiment is basically similar to that of the first embodiment. Thus, the same reference signs used to designate elements in the control system of the power steering device of the first embodiment shown in FIG. 2 will be applied to the corresponding reference signs used in the second embodiment shown in FIG. 7, for the purpose of comparison of the two different embodiments. A circuit denoted by reference sign 332 will be hereinafter described in detail with reference to the accompanying drawings, while detailed description of reference signs 1, 6, 7, 8, b4, 31, 32, 50, 51, and 52 will be omitted because the above description thereon seems to be self-explanatory. In the system of the first embodiment, booster circuit 50 is controlled, utilizing motor angular acceleration dωm/dt (=ωm) as a parameter (see motor angular acceleration detector 331 shown in FIG. 2). In contrast, in the system of the second embodiment, booster circuit 50 is controlled, utilizing a steering torque rate-of-change ΔTs (exactly, a rate of change of steering torque Ts with respect to time) as a parameter (see a steering torque rate-of-change estimation circuit or a steering torque rate-of-change estimation section 332 shown in FIG. 7).

As can be seen from the block diagram of FIG. 7 mainly showing the configuration of controller 30 incorporated in the control system of the power steering device of the second embodiment, steering torque rate-of-change estimation section 332 is provided to estimate steering torque rate-of-change ΔTs based on the sensor signal (steering torque TS) from torque sensor b4. Also provided is booster circuit control section 34 that controls the drive (switching between operating and non-operating states) of booster circuit 50 based on the steering torque rate-of-change ΔTs estimated by steering torque rate-of-change estimation section 332.

Figure 8:
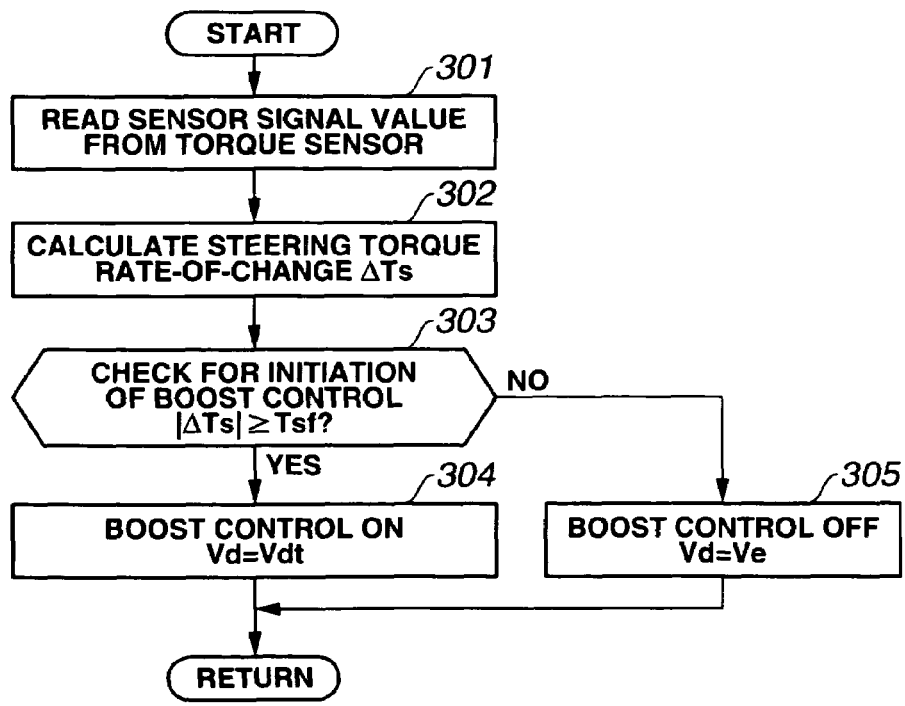
FIG. 8 is a flow chart showing control actions of a steering torque rate-of-change estimation circuit and a booster circuit control section included in the power steering control system for the power steering device of the second embodiment.

Referring now to FIG. 8, there is shown the subroutine executed within steering torque rate-of-change estimation section 332 and booster circuit control section 34 of controller 30 incorporated in the power steering device of the second embodiment.

At step 301, steering torque Ts is read. Concretely, steering torque Ts is determined based on the latest up-to-date informational data signal from torque sensor b4.

At step 302, steering torque rate-of-change ΔTs is arithmetically calculated or estimated based on steering torque Ts. Concretely, steering torque rate-of-change ΔTs is calculated as a rate of change of the more-recent steering torque value $Ts_{(new)}$ from the previous steering torque value $Ts_{(old)}$ with respect to a unit time t. That is, the steering torque rate-of-change ΔTs is represented by the derivative dTs/dt, which is the time rate of change of steering torque Ts.

At step 303, in order to determine whether boost control is enabled (initiated) or disabled (disengaged), a check is made to determine whether the absolute value |ΔTs| of steering torque rate-of-change ΔTs, calculated or estimated through steps 301-302, is greater than or equal to a steering torque rate-of-change threshold value Tsf. When the answer to step 303 is in the affirmative (YES), that is, in case of |ΔTs|≧Tsf, the routine proceeds from step 303 to step 304. Conversely when the answer to step 303 is in the negative (NO), that is, in case of |ΔTs|<Tsf, the routine proceeds from step 303 to step 305. Having compared the absolute value |ΔTS| of steering torque rate-of-change ΔTs to its threshold value Tsf corresponds to normal rotation and reverse rotation of motor 1. Steering torque rate-of-change threshold value Tsf means a critical value above which there is an increased tendency for the driver-applied steering torque to exceed a desired value due to a lack of steering assist.

At step 304, boost control becomes enabled (ON). A booster voltage Vd outputted from booster circuit 50 is risen or boosted up to a desired boost-up voltage Vdt, that is, Vd=Vdt.

At step 305, boost control becomes disabled (OFF) or remains disabled. Power source voltage Ve is outputted from booster circuit 50 as it is, that is, Vd=Ve.

The operation and effects attained by the control flow shown in FIG. 8 executed by controller 30 incorporated in the power steering device of the second embodiment are hereinafter explained. Basically, within steering-assist torque arithmetic calculation section 31, a desired steering-assist torque is calculated based on sensor signals (vehicle speed VSP and steering torque Ts) from vehicle speed sensor 7 and torque sensor b4. At this time, if the input informational data signal value regarding steering torque rate-of-change ΔTs is great, a variation in the calculated desired steering-assist torque becomes great. This means that motor angular acceleration dωm/dt (=αm) also becomes great. As already explained in reference to the system of the first embodiment, in the case of the great angular acceleration dωm/dt (=αm), there is an increased tendency for the generation of working fluid pressure (hydraulic pressure) to be delayed. That is, there is an increased tendency of a response delay of working fluid pressure control, in other words, a deteriorated steering assist control responsiveness.

To avoid this, by energizing booster circuit 50 under a specified condition where the absolute value |ΔTs| of steering torque rate-of-change ΔTs is great (i.e., |ΔTs|≧Tsf), the system of the second embodiment can provide the same operation and effects as the first embodiment. Additionally, the detection timing (estimation timing) of steering torque rate-of-change ΔTs estimated based steering torque Ts detected by torque sensor b4 is somewhat progressing in phase in comparison with the detection timing (the calculation timing) of motor angular acceleration dωm/dt (=αm=d²θm/dt²). That is, it is possible to detect or estimate steering torque rate-of-change ΔTs at an earlier stage rather than motor angular acceleration dωm/dt (=αm=d²θm/dt²). In the case of the system of the second embodiment utilizing steering torque rate-of-change ΔTs instead of utilizing motor angular acceleration dωm/dt (=αm=d²θm/dt²), the countermeasure against noise is required, but the utilization of steering torque rate-of-change ΔTs is superior to the utilization of motor angular acceleration dωm/dt (=αm) in steering-assist control responsiveness.

Third Embodiment

Figure 9:
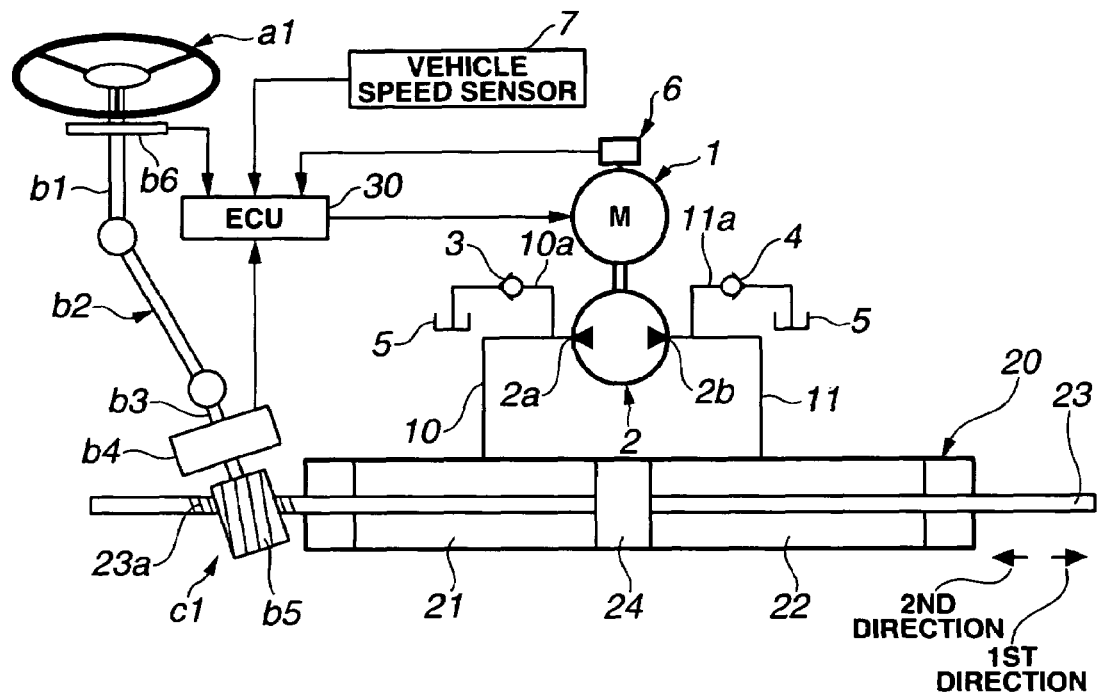
FIG. 9 is a system diagram illustrating the third embodiment of a power steering device.
Figure 10:
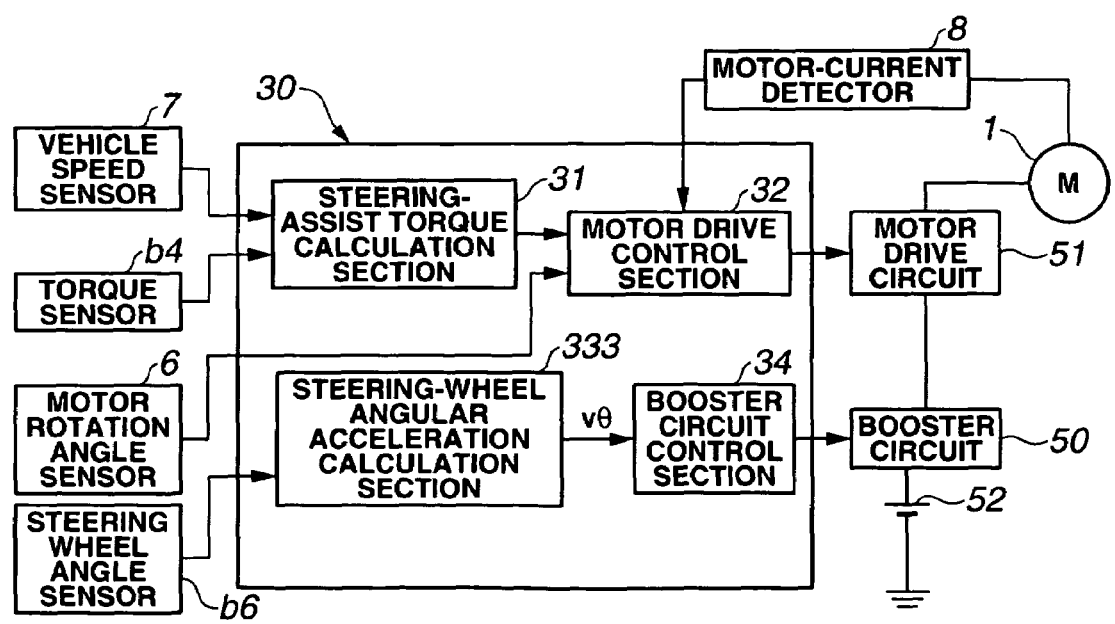
FIG. 10 is a block diagram showing the input section, the control section, and the output section of a controller incorporated in the power steering device of the third embodiment.

Referring now to FIGS. 9-10, there is shown the system configuration of the power steering device of the third embodiment. As can be appreciated from comparison of the system diagrams shown in FIGS. 1 and 9 and also appreciated from comparison of the block diagrams of FIGS. 2 and 10, the basic system configuration of the third embodiment is similar to that of the first embodiment. Thus, the same reference signs used to designate elements in the power steering device of the first embodiment shown in FIGS. 1-2 will be applied to the corresponding reference signs used in the third embodiment shown in FIGS. 9-10, for the purpose of comparison of the two different embodiments. A circuit denoted by reference sign 333 and a steering wheel angle sensor (simply, a steering angle sensor) b6 will be hereinafter described in detail with reference to the accompanying drawings, while detailed description of the other reference signs will be omitted because the above description thereon seems to be self-explanatory. In the system of the first embodiment, booster circuit 50 is controlled, utilizing motor angular acceleration dωm/dt (=αm) as a parameter (see motor angular acceleration detector 331 shown in FIG. 2). In contrast, in the system of the third embodiment, booster circuit 50 is controlled, utilizing the second-order derivative d²θ/dt² (hereinafter is referred to as "steering-wheel angular acceleration vθ") of steering wheel angle, simply steering angle θ, (angular displacement of steering wheel a1) as a parameter (see a steering-wheel angular acceleration arithmetic calculation circuit or a steering-wheel angular acceleration arithmetic calculation section 333 shown in FIG. 10).

As can be seen from the system diagram of the power steering device of the third embodiment of FIG. 9, steering wheel angle sensor b6 is attached to steering shaft b1 for detecting steering wheel angle θ (angular displacement of steering wheel a1 measured from the straight-ahead position). The other component parts of the power steering device of the third embodiment are identical to those of the first embodiment.

As can be seen from the block diagram of FIG. 10 mainly showing the configuration of controller 30 incorporated in the control system of the power steering device of the third embodiment, steering-wheel angular acceleration arithmetic calculation section 333 is provided to arithmetically calculate or estimate steering-wheel angular acceleration $v\theta$ ($=d^2\theta/dt^2$) based on the sensor signal (steering wheel angle $\theta$) from steering wheel angle sensor b6. Also provided is booster circuit control section 34 that controls the drive (switching between operating and non-operating states) of booster circuit 50 based on the steering-wheel angular acceleration $v\theta$ ($=d^2\theta/dt^2$) calculated by steering-wheel angular acceleration arithmetic calculation section 333.

Figure 11:
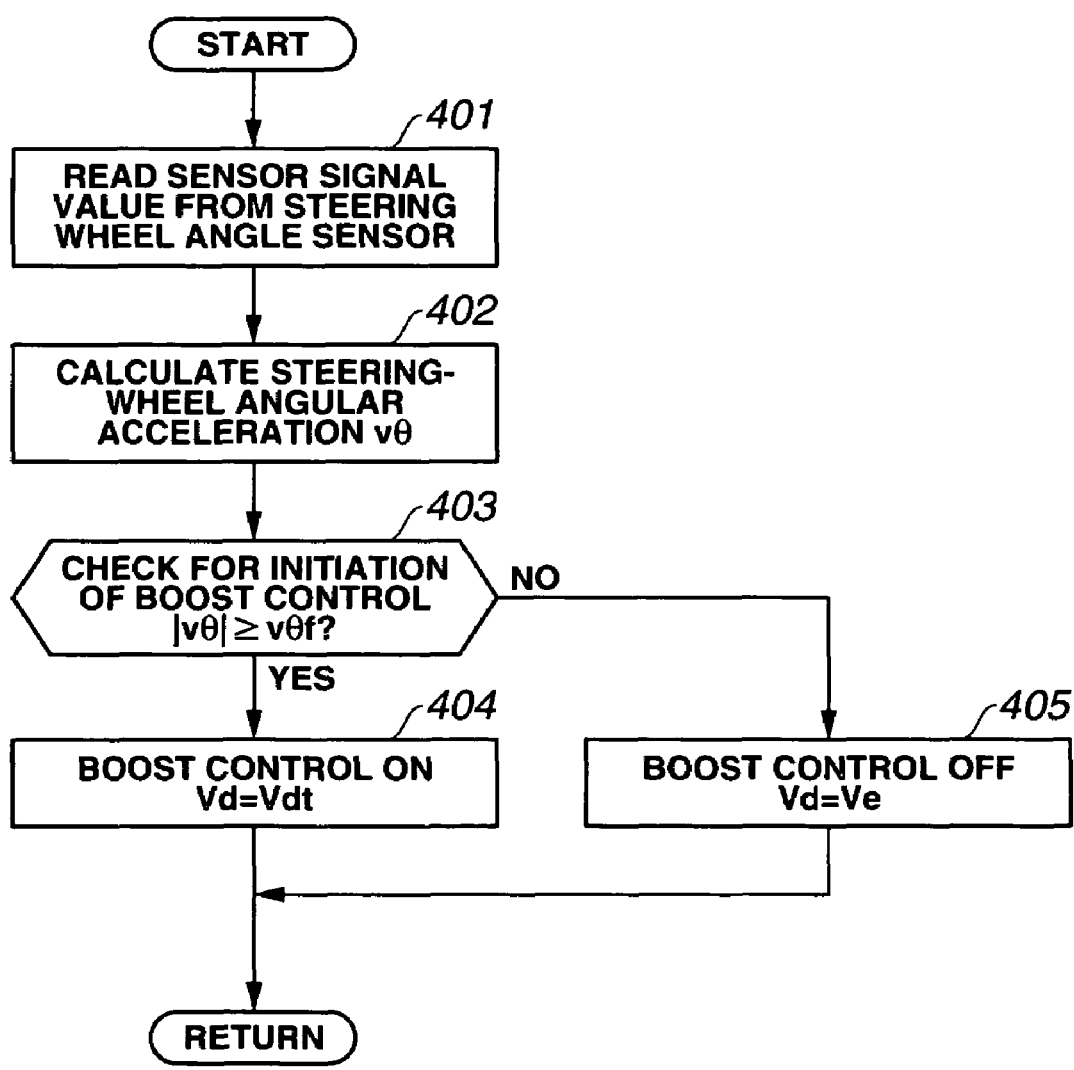
FIG. 11 is a flow chart showing control actions of a steering-wheel angular acceleration arithmetic circuit and a booster circuit control section included in the power steering control system for the power steering device of the third embodiment.

Referring now to FIG. 11, there is shown the subroutine executed within steering-wheel angular acceleration arithmetic calculation section 333 and booster circuit control section 34 of controller 30 incorporated in the power steering device of the third embodiment.

At step 401, steering wheel angle $\theta$ is read. Concretely, steering wheel angle $\theta$ is determined based on the latest up-to-date informational data signal from steering wheel angle sensor b6.

At step 402, steering-wheel angular acceleration $v\theta$ is arithmetically calculated based on steering wheel angle $\theta$. Concretely, steering-wheel angular acceleration $v\theta$ is calculated as the second-order derivative $d^2\theta/dt^2$ of steering wheel angle $\theta$ (angular displacement of steering wheel a1 measured from the straight-ahead position). More concretely, a steering-wheel angular velocity $\omega$ is, first, calculated as a rate of change of an angular displacement (i.e., as a rate of change of steering wheel angle $\theta$) of steering wheel a1 with respect to a unit time t. That is, the steering-wheel angular velocity $\omega$ is represented by the derivative $d\theta/dt$, which is the rate of change of steering wheel angle $\theta$ with respect to time. Second, steering-wheel angular acceleration $v\theta$ is calculated as a rate of change of steering-wheel angular velocity $\omega$ ($=d\theta/dt$) with respect to time. That is to say, steering-wheel angular acceleration $v\theta$ is represented by the equation $v\theta=d\omega/dt=d^2\theta/dt^2$.

At step 403, in order to determine whether boost control is enabled (initiated) or disabled (disengaged), a check is made to determine whether the absolute value $|v\theta|$ of steering-wheel angular acceleration $v\theta$, calculated through steps 401-402, is greater than or equal to a steering-wheel angular acceleration threshold value $v\theta f$. When the answer to step 403 is in the affirmative (YES), that is, in case of $|v\theta|\geq v\theta f$, the routine proceeds from step 403 to step 404. Conversely when the answer to step 403 is in the negative (NO), that is, in case of $|v\theta|<v\theta f$, the routine proceeds from step 403 to step 405. Having compared the absolute value $|v\theta|$ of steering-wheel angular acceleration $v\theta$ to its threshold value $v\theta f$ corresponds to normal rotation and reverse rotation of motor 1. Steering-wheel angular acceleration threshold value $v\theta f$ means a critical value above which there is an increased tendency for the driver-applied steering torque to exceed a desired value due to a lack of steering assist.

At step 404, boost control becomes enabled (ON). A booster voltage Vd outputted from booster circuit 50 is risen or boosted up to a desired boost-up voltage Vdt, that is, Vd=Vdt.

At step 405, boost control becomes disabled (OFF) or remains disabled. Power source voltage Ve is outputted from booster circuit 50 as it is, that is, Vd=Ve.

The operation and effects attained by the control flow shown in FIG. 11 executed by controller 30 incorporated in the power steering device of the third embodiment are hereinafter explained. Basically, within steering-assist torque arithmetic calculation section 31, a desired steering-assist torque is calculated based on sensor signals (vehicle speed VSP and steering torque Ts) from vehicle speed sensor 7 and torque sensor b4. At this time, if the input informational data signal value regarding steering-wheel angular acceleration $v\theta$ is great, a variation in the calculated desired steering-assist torque becomes great. This is because steering torque Ts is substantially in proportion to the second-order derivative $d^2\theta/dt^2$ of steering wheel angle $\theta$, that is, steering-wheel angular acceleration $v\theta$. The great desired steering-assist torque means that motor angular acceleration $d\omega m/dt$ ($=\alpha m$) also becomes great. As already explained in reference to the system of the first embodiment, in the case of the great angular acceleration $d\omega m/dt$ ($=\alpha m$), there is an increased tendency for the generation of working fluid pressure (hydraulic pressure) to be delayed. That is, there is an increased tendency of a response delay of working fluid pressure control, in other words, a deteriorated steering assist control responsiveness.

To avoid this, by energizing booster circuit 50 under a specified condition where the absolute value $|v\theta|$ of steering-wheel angular acceleration $v\theta$ is great (i.e., $|v\theta|\geq v\theta f$), the system of the third embodiment can provide the same operation and effects as the first embodiment.

Fourth Embodiment

Figure 12:
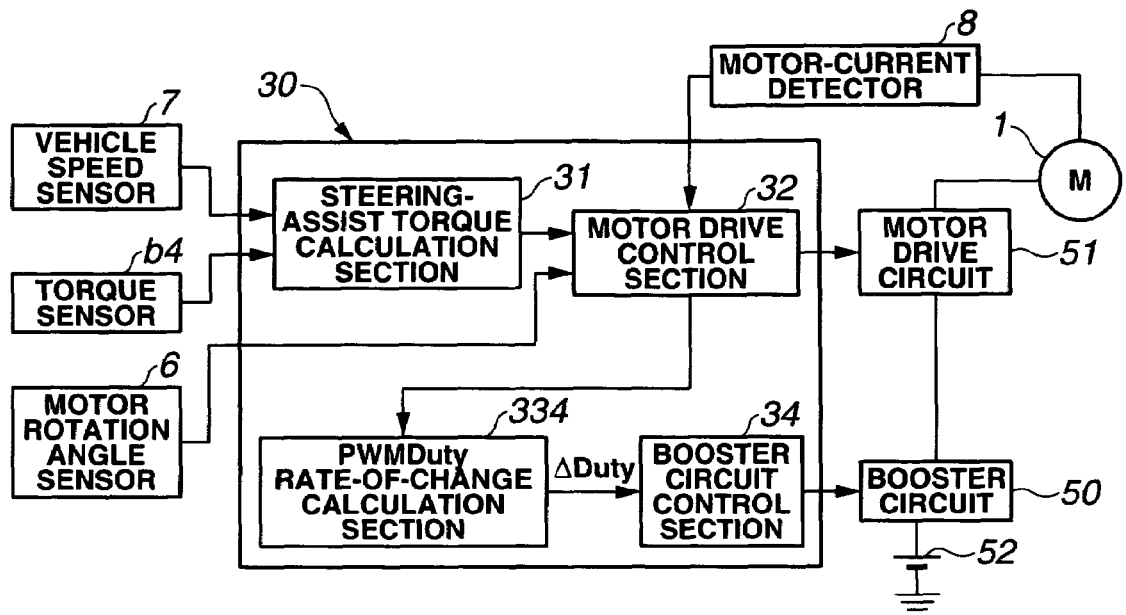
FIG. 12 is a block diagram showing the input section, the control section, and the output section of a controller incorporated in the power steering device of the fourth embodiment.

Referring now to FIG. 12, there is shown the detailed configuration of the control system of the power steering device of the fourth embodiment. As can be appreciated from comparison of the block diagrams shown in FIGS. 2 and 12, the configuration of the control system of the power steering device of the fourth embodiment is basically similar to that of the first embodiment. Thus, the same reference signs used to designate elements in the control system of the power steering device of the first embodiment shown in FIG. 2 will be applied to the corresponding reference signs used in the fourth embodiment shown in FIG. 12, for the purpose of comparison of the two different embodiments. A circuit denoted by reference sign 334 will be hereinafter described in detail with reference to the accompanying drawings, while detailed description of the other reference signs will be omitted because the above description thereon seems to be self-explanatory. In the system of the first embodiment, booster circuit 50 is controlled, utilizing motor angular acceleration $d\omega m/dt$ ($=\alpha m$) as a parameter (see motor angular acceleration detector 331 shown in FIG. 2). In contrast, in the system of the fourth embodiment, booster circuit 50 is controlled, utilizing a rate of change $\Delta$Duty of a duty cycle value Duty of a pulse-width modulated (PWM) signal (a PWM duty-cycle signal) applied to motor 1 with respect to time (hereinafter is referred to as "PWM duty rate-of-change $\Delta$Duty") as a parameter (see a PWM duty-cycle signal rate-of-change calculation circuit or a PWM duty rate-of-change calculation section 334 shown in FIG. 12). The duty cycle value Duty of the PWM signal corresponds to a motor command current value Imo (i.e., the desired motor driving current value or the motor control command signal value).

As can be seen from the block diagram of FIG. 12 mainly showing the configuration of controller 30 incorporated in the control system of the power steering device of the fourth embodiment, within motor drive control section 32, motor command current value Imo is first calculated or computed based on the desired steering-assist torque calculated by steering-assist torque arithmetic calculation section 31. Then, motor drive control section 32 outputs the PWM signal of duty cycle value Duty, which is determined based on a deviation between the calculated motor command current value Imo and the actual motor current value Im detected by motor-current detector 8, to the switching circuit of motor drive circuit 51. PWM duty rate-of-change calculation section 334 receives input information about duty cycle value Duty of the PWM signal from motor drive control section 32, and arithmetically calculates or estimates PWM duty rate-of-change ΔDuty based on the received duty cycle value Duty of the PWM signal. Also provided is booster circuit control section 34 that controls the drive (switching between operating and non-operating states) of booster circuit 50 based on the PWM duty rate-of-change ΔDuty calculated by PWM duty rate-of-change calculation section 334.

Figure 13:
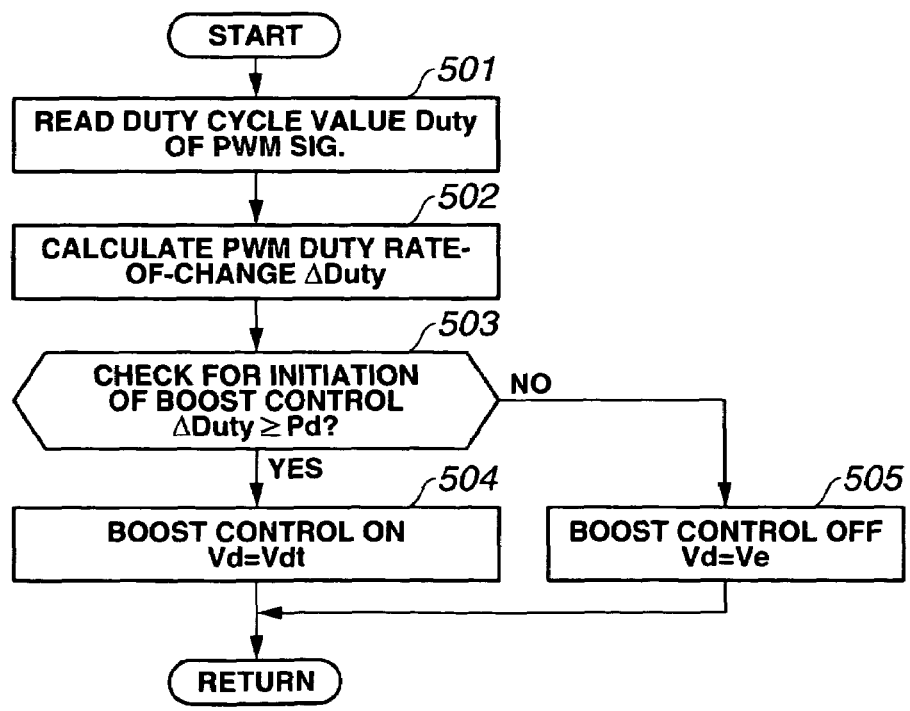
FIG. 13 is a flow chart showing control actions of a PWM duty cycle value rate-of-change arithmetic circuit and a booster circuit control section included in the power steering control system for the power steering device of the fourth embodiment.

Referring now to FIG. 13, there is shown the subroutine executed within PWM duty rate-of-change calculation section 334 and booster circuit control section 34 of controller 30 incorporated in the power steering device of the fourth embodiment.

At step 501, duty cycle value Duty of the PWM signal is read. Concretely, duty cycle value Duty of the PWM signal is determined based on the latest up-to-date informational data signal from motor drive control section 32.

At step 502, PWM duty rate-of-change ΔDuty is arithmetically calculated based on duty cycle value Duty. Concretely, PWM duty rate-of-change ΔDuty is calculated as a rate of change of the more-recent duty cycle value $Duty_{(new)}$ from the previous duty cycle value $Duty_{(old)}$ with respect to a unit time t. The more-recent duty cycle value $Duty_{(new)}$ is computed at the current execution cycle, whereas the previous duty cycle value $Duty_{(old)}$ is computed one cycle before. That is, the PWM duty rate-of-change ΔDuty is represented by the derivative dDuty/dt, which is the time rate of change of duty cycle value Duty.

At step 503, in order to determine whether boost control is enabled (initiated) or disabled (disengaged), a check is made to determine whether PWM duty rate-of-change ΔDuty, calculated through steps 501-502, is greater than or equal to a PWM duty rate-of-change threshold value Pd. When the answer to step 503 is in the affirmative (YES), that is, in case of ΔDuty≧Pd, the routine proceeds from step 503 to step 504. Conversely when the answer to step 503 is in the negative (NO), that is, in case of ΔDuty<Pd, the routine proceeds from step 503 to step 505.

At step 504, boost control becomes enabled (ON). A booster voltage Vd outputted from booster circuit 50 is risen or boosted up to a desired boost-up voltage Vdt, that is, Vd=Vdt.

At step 505, boost control becomes disabled (OFF) or remains disabled. Power source voltage Ve is outputted from booster circuit 50 as it is, that is, Vd=Ve.

The operation and effects attained by the control flow shown in FIG. 13 executed by controller 30 incorporated in the power steering device of the fourth embodiment are hereinafter explained. Basically, within steering-assist torque arithmetic calculation section 31, a desired steering-assist torque is calculated based on sensor signals (vehicle speed VSP and steering torque Ts) from vehicle speed sensor 7 and torque sensor b4. Then, within motor drive control section 32, motor command current value Imo is calculated based on the desired steering-assist torque calculated by steering-assist torque arithmetic calculation section 31. And then, motor drive control section 32 outputs the PWM signal of duty cycle value Duty, determined based on a deviation between the calculated motor command current value Imo and the actual motor current value Im, to the switching circuit of motor drive circuit 51. At this time, if the input informational data signal value regarding PWM duty rate-of-change ΔDuty is great, motor angular acceleration dωm/dt (=αm) becomes great, since duty cycle value Duty of the PWM signal varies responsively to a change in steering torque Ts. Therefore, as already explained in reference to the system of the first embodiment, in the case of the great angular acceleration dωm/dt (=αm), there is an increased tendency for the generation of working fluid pressure (hydraulic pressure) to be delayed. That is, there is an increased tendency of a response delay of working fluid pressure control, in other words, a deteriorated steering assist control responsiveness.

To avoid this, by energizing booster circuit 50 under a specified condition where PWM duty rate-of-change ΔDuty is great (i.e., ΔDuty≧Pd), the system of the fourth embodiment can provide the same operation and effects as the first embodiment. Additionally, the PWM signal of the calculated duty cycle value Duty is an electric command signal, and thus it is possible to determine a source-voltage boost timing without any additional sensors.

Fifth Embodiment

Figure 14:
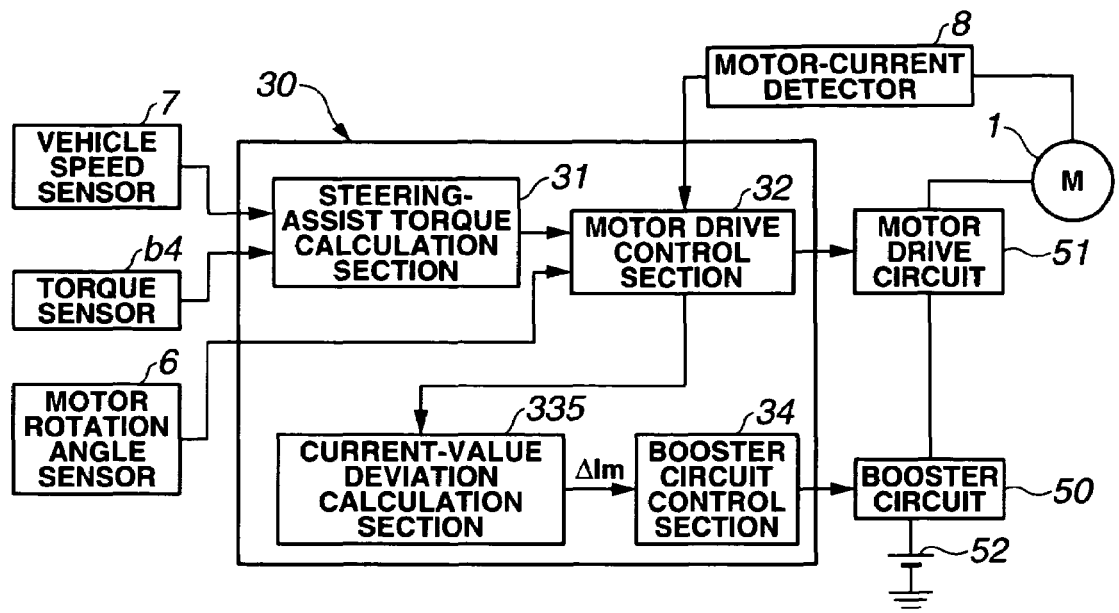
FIG. 14 is a block diagram showing the input section, the control section, and the output section of a controller incorporated in the power steering device of the fifth embodiment.

Referring now to FIG. 14, there is shown the detailed configuration of the control system of the power steering device of the fifth embodiment. As can be appreciated from comparison of the block diagrams shown in FIGS. 2 and 14, the configuration of the control system of the power steering device of the fifth embodiment is basically similar to that of the first embodiment. Thus, the same reference signs used to designate elements in the control system of the power steering device of the first embodiment shown in FIG. 2 will be applied to the corresponding reference signs used in the fifth embodiment shown in FIG. 14, for the purpose of comparison of the two different embodiments. A circuit denoted by reference sign 335 will be hereinafter described in detail with reference to the accompanying drawings, while detailed description of the other reference signs will be omitted because the above description thereon seems to be self-explanatory. In the system of the first embodiment, booster circuit 50 is controlled, utilizing motor angular acceleration dωm/dt (=αm) as a parameter (see motor angular acceleration detector 331 shown in FIG. 2). In contrast, in the system of the fifth embodiment, booster circuit 50 is controlled, utilizing a deviation ΔIm between the motor command current value Imo calculated by motor drive control section 32 and the actual motor current value Im detected by motor-current detector 8 as a parameter (see an electric-current-value deviation calculation circuit or an electric-current-value deviation calculation section 335 shown in FIG. 14).

As can be seen from the block diagram of FIG. 14 mainly showing the configuration of controller 30 incorporated in the control system of the power steering device of the fifth embodiment, within motor drive control section 32, motor command current value Imo is first calculated or computed based on the desired steering-assist torque calculated by steering-assist torque arithmetic calculation section 31. Then, motor drive control section 32 outputs the PWM signal of duty cycle value Duty, which is determined based on a deviation ΔIm between the calculated motor command current value Imo and the actual motor current value Im, to the switching circuit of motor drive circuit 51. Current-value deviation calculation section 335 receives input information about the motor command current value Imo corresponding to duty cycle value Duty of the PWM signal applied to motor drive circuit 51 and the actual current value Im detected by motor-current detector 8, and arithmetically calculates the deviation ΔIm (=Imo−Im) between the calculated motor command current value Imo and the actual motor current value Im. Also provided is booster circuit control section 34 that controls the drive (switching between operating and non-operating states) of booster circuit 50 based on the deviation ΔIm calculated by current-value deviation calculation section 335. In the control system of the fifth embodiment shown in FIG. 14, within motor drive control section 32 and current-value deviation calculation section 335, the current-value deviation ΔIm is calculated individually. In lieu thereof, the deviation ΔIm calculated within motor drive control section 32 may be diverted.

Figure 15:
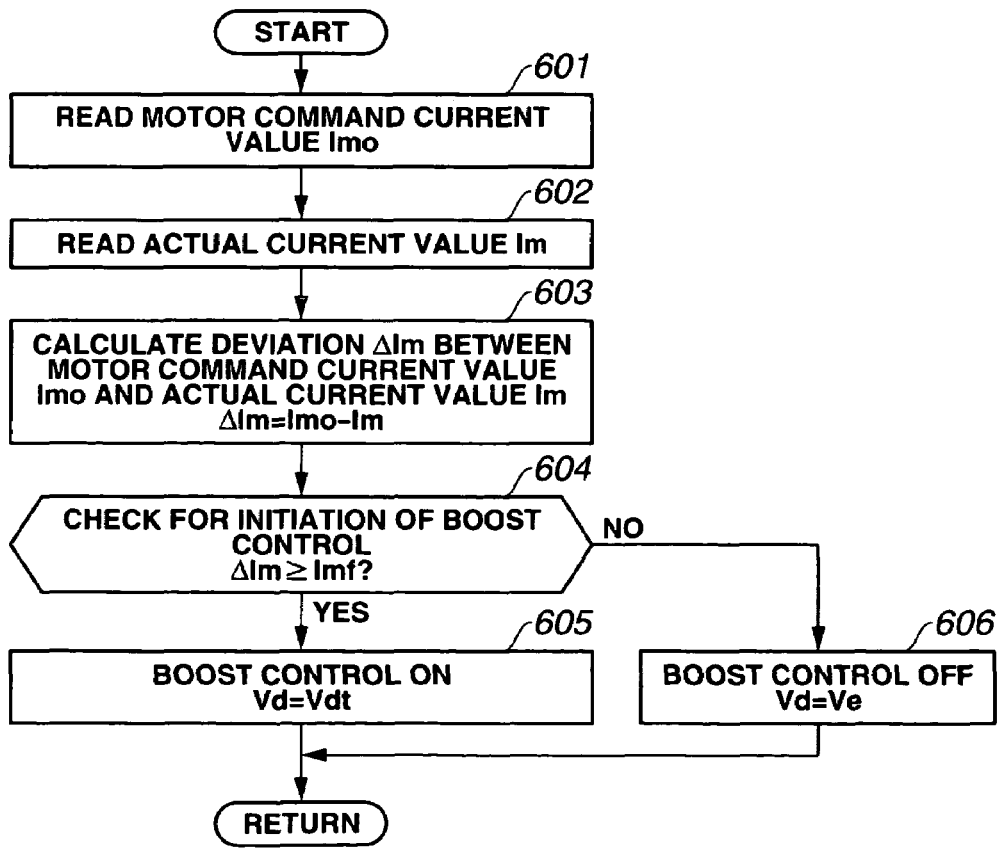
FIG. 15 is a flow chart showing control actions of a current-value deviation arithmetic circuit and a booster circuit control section included in the power steering control system for the power steering device of the fifth embodiment.

Referring now to FIG. 15, there is shown the subroutine executed within current-value deviation calculation section 335 and booster circuit control section 34 of controller 30 incorporated in the power steering device of the fifth embodiment.

At step 601, motor command current value Imo from motor drive control section 32 is read.

At step 602, actual current value Im detected by motor-current detector 8 is read.

At step 603, deviation ΔIm between motor command current value Imo and actual current value Im is calculated from the equation ΔIm=Imo−Im.

At step 604, in order to determine whether boost control is enabled (initiated) or disabled (disengaged), a check is made to determine whether deviation ΔIm, calculated through steps 601-603, is greater than or equal to a current-value deviation threshold value Imf. When the answer to step 604 is in the affirmative (YES), that is, in case of ΔIm≧Imf, the routine proceeds from step 604 to step 605. Conversely when the answer to step 604 is in the negative (NO), that is, in case of ΔIm<Imf, the routine proceeds from step 604 to step 606.

At step 605, boost control becomes enabled (ON). A booster voltage Vd outputted from booster circuit 50 is risen or boosted up to a desired boost-up voltage Vdt, that is, Vd=Vdt.

At step 606, boost control becomes disabled (OFF) or remains disabled. Power source voltage Ve is outputted from booster circuit 50 as it is, that is, Vd=Ve.

The operation and effects attained by the control flow shown in FIG. 15 executed by controller 30 incorporated in the power steering device of the fifth embodiment are hereinafter explained. Basically, within steering-assist torque arithmetic calculation section 31, a desired steering-assist torque is calculated based on sensor signals (vehicle speed VSP and steering torque Ts) from vehicle speed sensor 7 and torque sensor b4. Then, within motor drive control section 32, motor command current value Imo is calculated based on the desired steering-assist torque calculated by steering-assist torque arithmetic calculation section 31. And then, motor drive control section 32 outputs motor command current value Imo determined based on the desired steering-assist torque. If a change in steering torque Ts is great, motor command current value Imo higher than actual current value Im is outputted, and thus the deviation ΔIm between motor command current value Imo and actual current value Im becomes great. At this time, the driving current of a high current value is supplied through motor drive circuit 51 to motor 1, in such a manner as to follow the great deviation ΔIm. As a result of this, it seems that motor angular acceleration dωm/dt (=αm) becomes great. Therefore, as already explained in reference to the system of the first embodiment, in the case of the great angular acceleration dωm/dt (=αm), there is an increased tendency for the generation of working fluid pressure (hydraulic pressure) to be delayed. That is, there is an increased tendency of a response delay of working fluid pressure control, in other words, a deteriorated steering assist control responsiveness.

To avoid this, by energizing booster circuit 50 under a specified condition where current-value deviation ΔIm is great (i.e., ΔIm≧Imf), the system of the fifth embodiment can provide the same operation and effects as the first embodiment.

Sixth Embodiment

Figure 16:
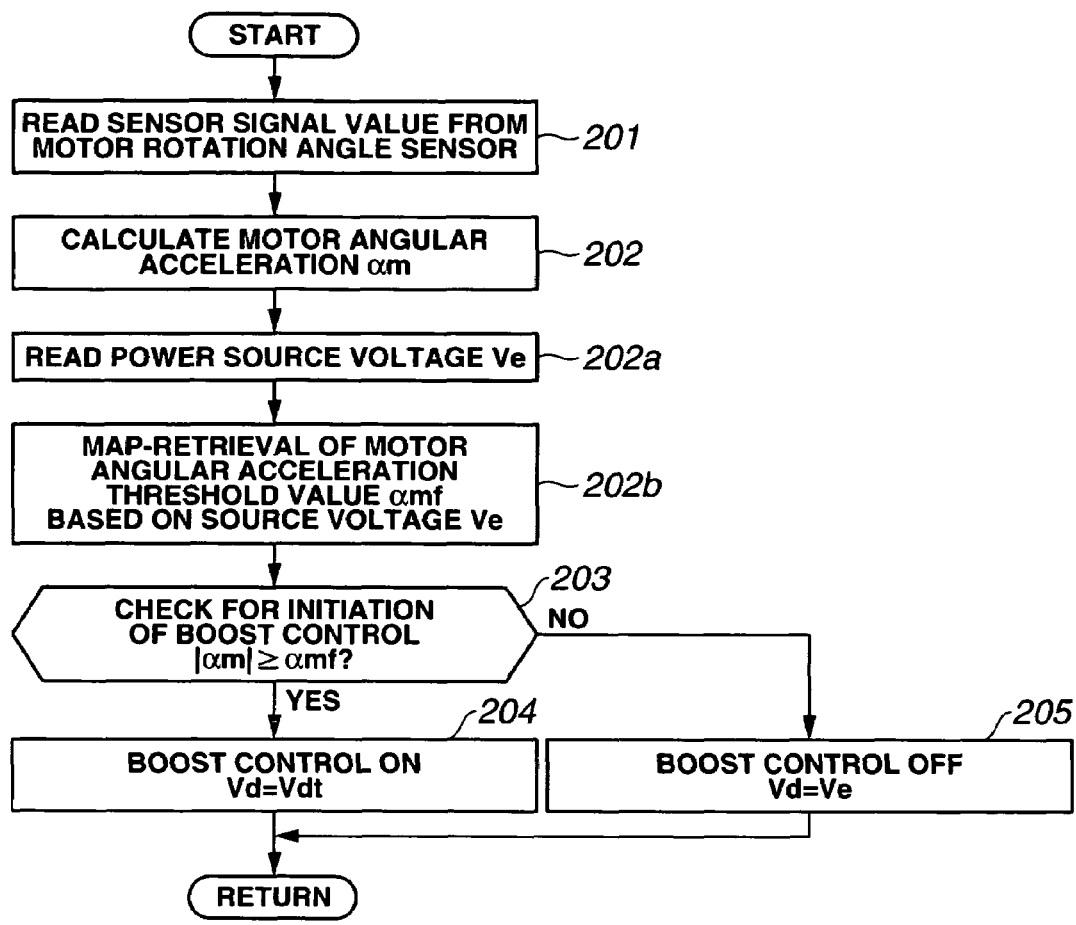
FIG. 16 is a flow chart showing control actions of a motor angular acceleration detector and a booster circuit control section included in the power steering control system for the power steering device of the sixth embodiment.
Figure 17:
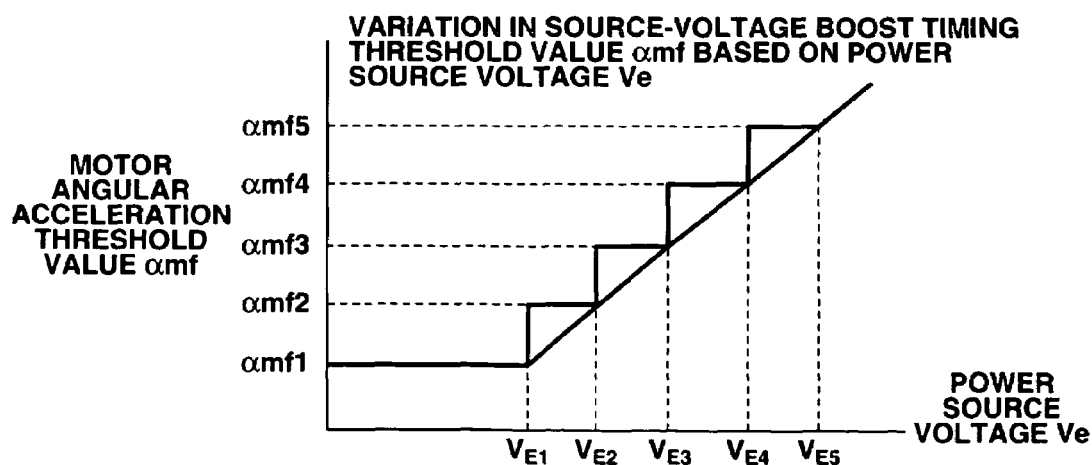
FIG. 17 is a preprogrammed power source voltage Ve versus motor angular acceleration threshold value αmfn characteristic map for the power steering control system of the sixth embodiment.

Referring now to FIG. 16, there is shown the subroutine somewhat modified from the subroutine of FIG. 4 and executed within motor angular acceleration detector 331 and booster circuit control section 34 of controller 30 incorporated in the power steering device of the sixth embodiment. As can be appreciated from comparison of the subroutines shown in FIGS. 4 and 16, the configuration of the control system of the power steering device of the sixth embodiment is basically similar to that of the first embodiment. In the system of the first embodiment, boost control becomes enabled (ON), under a specified condition where the absolute value |αm| of motor angular acceleration αm (=dωm/dt) is greater than or equal to one predetermined motor angular acceleration threshold value αmf. That is, motor angular acceleration αm is compared to the single motor angular acceleration threshold value αmf, which is fixed. In contrast, the system of the sixth embodiment uses a variable motor angular acceleration threshold value αmfn, which is variable depending on power source voltage Ve (see the preprogrammed power source voltage Ve versus motor angular acceleration threshold value αmfn characteristic map shown in FIG. 17). In the variable motor angular acceleration threshold value αmfn, n is a positive integer. That is, depending on the voltage level of power source voltage Ve, a plurality of threshold values αmf1, αmf2, αmf3, . . . , αmfn are set. The configuration of controller 30 incorporated in the control system of the power steering device of the sixth embodiment of FIG. 16 is basically similar to that of the first embodiment. The system of the sixth embodiment is different from that of the first embodiment, in that (i) a signal line, through which information data about the voltage level of power source voltage Ve can be read, is attached to booster circuit control section 34, and additionally (ii) the preprogrammed power source voltage Ve versus motor angular acceleration threshold value αmfn characteristic map shown in FIG. 17 is built in booster circuit control section 34.

In the modified subroutine of FIG. 16 (the sixth embodiment) similar to FIG. 4 (the first embodiment), only two steps 202a and 202b are added. Thus, the same step numbers used to designate steps in the subroutine shown in FIG. 4 will be applied to the corresponding step numbers used in the modified subroutine shown in FIG. 16, for the purpose of comparison of the two different interrupt subroutines. Steps 202a and 202b will be hereinafter described in detail with reference to the accompanying drawings, while steps 201 through 205 will be briefly described.

At step 201, motor rotation angle θm is read.

At step 202, motor angular acceleration αm is arithmetically calculated as the second-order derivative $d^2 θm/dt^2$ of motor rotation angle θm.

At step 202a, power source voltage Ve is read.

At step 202b, motor angular acceleration threshold value αmf is computed or retrieved, based on the voltage level of power source voltage Ve read through step 202a, from the preprogrammed power source voltage Ve versus motor angular acceleration threshold value αmfn characteristic map shown in FIG. 17.

At step 203, in order to determine whether boost control is enabled (initiated) or disabled (disengaged), a check is made to determine whether the absolute value |αm| of motor angular acceleration αm, calculated through steps 201-202, is greater than or equal to the map-retrieved motor angular acceleration threshold value αmf. When the answer to step 203 is in the affirmative (YES), that is, in case of |αm|≧αmf, the routine proceeds from step 203 to step 204. Conversely when the answer to step 203 is in the negative (NO), that is, in case of |αm|<αmf, the routine proceeds from step 203 to step 205. Having compared the absolute value |αm| of motor angular acceleration αm to its threshold value αmf corresponds to normal rotation and reverse rotation of motor 1. Motor angular acceleration threshold value αmf means a critical value above which there is an increased tendency for the driver-applied steering torque to exceed a desired value due to a lack of steering assist.

At step 204, boost control becomes enabled (ON). A booster voltage Vd outputted from booster circuit 50 is risen or boosted up to a desired boost-up voltage Vdt, that is, Vd=Vdt.

At step 205, boost control becomes disabled (OFF) or remains disabled. Power source voltage Ve is outputted from booster circuit 50 as it is, that is, Vd=Ve.

The fundamental operation and effects of the system of the sixth embodiment are similar to the first embodiment. Thus, only the different operation and effects of the system of the sixth embodiment are hereunder explained.

As appreciated from the Ve-αmfn characteristic map shown in FIG. 17, the voltage level of power source voltage Ve is actually classified into five voltages $V_{E1}$, $V_{E2}$, $V_{E3}$, $V_{E4}$, and $V_{E5}$, whose voltage level is defined by the inequality $V_{E1}<V_{E2}<V_{E3}<V_{E4}<V_{E5}$. The first, second, third, fourth, and fifth motor angular acceleration threshold values αmf1, αmf2, αmf3, αmf4, and αmf5 correspond to the respective voltage levels $V_{E1}$, $V_{E2}$, $V_{E3}$, $V_{E4}$, and $V_{E5}$. When power source voltage Ve is low, boost control must be initiated as quickly as possible, so as to ensure a desired motor speed and a desired motor torque. Conversely when power source voltage Ve is high, there is a less necessity for boost control depending on the case. That is, by specifying such a state where boost control is required truly or actually, while fully taking into account the voltage level of power source voltage Ve, it is possible to effectively reduce the frequency of executions of boost control, thus enhancing the durability of booster circuit 50.

Seventh Embodiment

Figure 18:
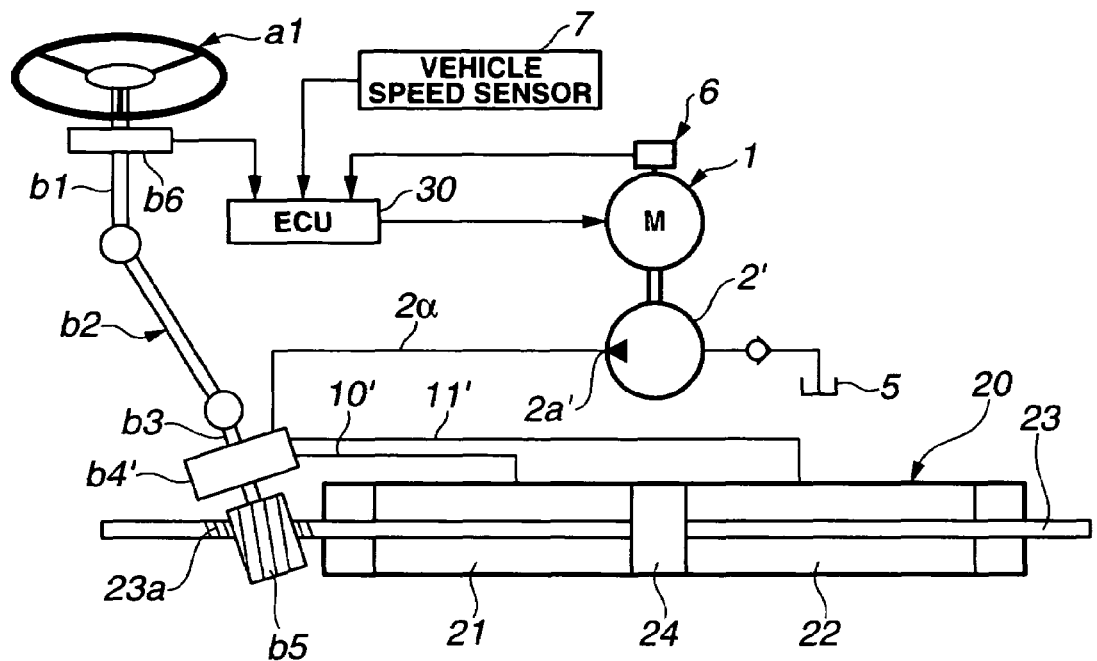
FIG. 18 is a system diagram illustrating the seventh embodiment of a power steering device.
Figure 19:
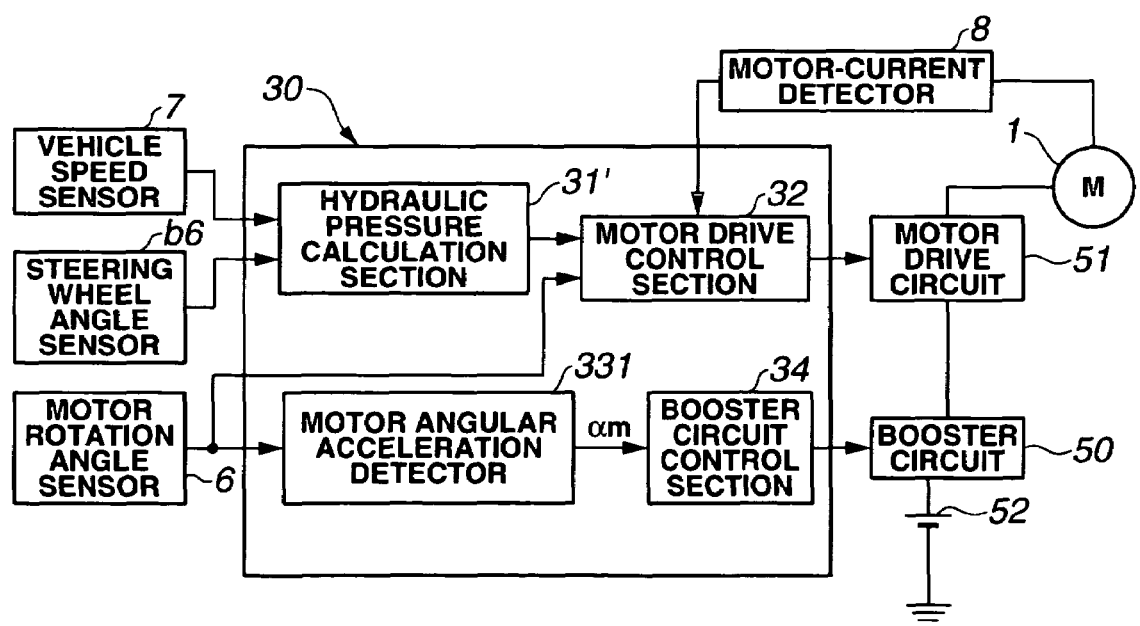
FIG. 19 is a block diagram showing the input section, the control section, and the output section of a controller incorporated in the power steering device of the seventh embodiment.

Referring now to FIGS. 18-19, there are shown the system configuration of the power steering device of the seventh embodiment. As can be appreciated from comparison of the system diagrams shown in FIGS. 1 and 18 and also appreciated from comparison of the block diagrams of FIGS. 2 and 19, the basic system configuration of the seventh embodiment is similar to that of the first embodiment. Thus, the same reference signs used to designate elements in the power steering device of the first embodiment shown in FIGS. 1-2 will be applied to the corresponding reference signs used in the seventh embodiment shown in FIGS. 18-19, for the purpose of comparison of the two different embodiments. A circuit denoted by reference sign 31' will be hereinafter described in detail with reference to the accompanying drawings, while detailed description of the other reference signs will be omitted because the above description thereon seems to be self-explanatory.

As can be seen from the system diagram of the power steering device of the seventh embodiment of FIG. 18, steering wheel angle sensor b6 is attached to steering shaft b1 for detecting steering wheel angle θ (angular displacement of steering wheel a1 measured from the straight-ahead position). A rotary directional-control valve (simply, a rotary valve) b4', such as a four-way three-position rotary valve, is installed onto pinion shaft b3, for switching the supply of working pressure created by a one-directional pump 2' from one of first and second cylinder chambers 21 and 22 to the other. Concretely, rotary valve b4' is comprised of a valve body and a rotor closely fitted in the valve body such that passages in the rotor connect or block off the ports in the valve body to provide four flow paths. Although it is not clearly shown in FIG. 18, rotary valve b4' has the four ports, namely the pump port, the two outlet ports, and the tank port (the drain port). The pump port of rotary valve b4' is connected via a fluid line 2a to a discharge port 2a' of one-directional pump 2' that allows for only one direction of working fluid discharged. The first outlet port of rotary valve b4' is connected via a fluid line 10' to first cylinder chamber 21, whereas the second outlet port of rotary valve b4' is connected via a fluid line 11' to second cylinder chamber 22. The tank port (the drain port) of rotary valve b4' is connected to reservoir tank 5. Sensor signals from the previously-discussed engine/vehicle sensors b6, 6, 7, and 8 are input into the input interface circuitry of controller 30 for controlling the drive (switching between operating and non-operating states) of booster circuit 50 and for controlling the drive of motor 1.

As can be seen from the block diagram of FIG. 19 mainly showing the configuration of controller 30 incorporated in the control system of the power steering device of the seventh embodiment, the processor of controller 30 includes a hydraulic pressure arithmetic calculation section (a hydraulic pressure calculation circuit or hydraulic pressure calculation means) 31' that calculates a desired hydraulic pressure to be created or produced by one-directional pump 2' based on sensor signals (vehicle speed VSP and steering wheel angle θ) from vehicle speed sensor 7 and steering wheel angle sensor b6. The processor of controller 30 also includes motor drive control section 32 that outputs a control command signal to motor drive circuit 51 by way of servo control based on both the actual motor driving current value Im detected by motor-current detector 8 and the desired hydraulic pressure calculated by hydraulic pressure arithmetic calculation section 31', in a manner so as to achieve the calculated desired hydraulic pressure and thus to bring the actual hydraulic pressure from pump 2' closer to the desired hydraulic pressure. The processor of controller 30 also includes motor angular acceleration detector 331 that detects or determines or estimates motor angular acceleration αm based on motor rotation angle θm detected by motor rotation angle sensor 6. Also provided is booster circuit control section 34 that controls the drive (switching between operating and non-operating states) of booster circuit 50 based on the motor angular acceleration αm detected by motor angular acceleration detector 331. Within hydraulic pressure arithmetic calculation section 31', the desired hydraulic pressure, corresponding to the maximum working pressure, substantially corresponding to the driver-required steering assist, is calculated based on vehicle speed VSP and steering wheel angle θ. Concretely, the desired hydraulic pressure is calculated based on vehicle speed VSP and a variation in steering wheel angle θ. More concretely, under a state where vehicle speed VSP is low and the variation in steering wheel angle θ is great, the desired hydraulic pressure is set to a high pressure value. Under a state where vehicle speed VSP is low and the variation in steering wheel angle θ is small, the desired hydraulic pressure is set to a low pressure value. Under a state where vehicle speed VSP is high, the desired hydraulic pressure is set to a relatively low pressure value as compared to the vehicle traveling state at low speeds. As set out above, in a similar manner to the first embodiment, the power steering device of the seventh embodiment is also constructed so that steering wheel a1 and motor 1 are connected to each other via working fluid. In other words, steering wheel a1 and motor 1 are connected to each other via an integral element (hydraulic power cylinder 20). Hydraulic power cylinder 20 serves as the integral element, since a volume change of each of first and second cylinder chambers 21-22 of power cylinder 20 is achieved by movement of working fluid produced by rotation of motor 1. Therefore, a desired steering assist characteristic will not be able to be provided without rotating motor 1 faster than rotation of steering wheel a1.

Under a state where vehicle speed VSP is low and the variation in steering wheel angle θ is great for example, during parking or cornering, generally, a required hydraulic pressure is high and a rapid motor speed rise is required. In such a case, a lack in motor driving current occurs owing to the rapid motor speed rise. This results in a lack in motor torque Tm and thus a drop of motor speed takes place. This leads to a lack in hydraulic pressure generated by the pump. Consequently, steering assist force becomes insufficient.

To avoid this, when a lack of steering assist force is likely to occur, power source voltage Ve is boosted up to the desired value Vdt by way of boost control and as a result the applied voltage to motor 1 is properly increased in such a manner as to compensate for a lack of motor speed (a lack of motor angular velocity ωm). In the power steering control system for the power steering device of the seventh embodiment, as a measure in case that a lack of steering assist force is likely to occur, a comparison result (|αm|≧αmf or |αm|<αmf) of the latest up-to-date informational data about motor angular acceleration αm and its threshold value αmf is used, and the processor of controller 30 determines that a lack of steering assist force is likely to occur, when the absolute value |αm| of motor angular acceleration αm is greater than or equal to motor angular acceleration threshold value αmf. According to the power steering control system for the power steering device of the seventh embodiment, the boost control function becomes engaged (enabled) and booster circuit 50 becomes energized (ON) immediately when the absolute value |αm| of motor angular acceleration αm exceeds its threshold value αmf, and thus it is possible to timely rise the motor speed (motor angular velocity ωm) up to a higher value. As a result of this, the driver-applied steering torque becomes smaller and it is possible to avoid a response delay of working fluid pressure control, in other words, a deteriorated steering assist control responsiveness. In the seventh embodiment shown in FIGS. 18-19, as a parameter used to determine a source-voltage boost timing, motor angular acceleration αm detected by motor angular acceleration detector 331 is utilized. In lieu thereof, the system of the seventh embodiment may utilize steering torque rate-of-change ΔTs estimated by steering torque rate-of-change estimation section 332, steering-wheel angular acceleration vθ calculated by steering-wheel angular acceleration arithmetic calculation section 333, PWM duty rate-of-change ΔDuty calculated by PWM duty rate-of-change calculation section 334, or current-value deviation ΔIm (=Imo−Im) calculated by current-value deviation calculation section 335.

It is more preferable that each of the systems of the shown embodiments is constructed to further include a vehicle-speed dependent boost control inhibition section (a vehicle-speed dependent boost control inhibition circuit or vehicle-speed dependent boost control inhibition means) that inhibits boost control under a specified condition (VSP≧VSPf) where vehicle speed VSP is greater than or equal to a predetermined speed value VSPf above which a large magnitude of steering assist torque (steering assist force) is not needed. Basically, during high-speed driving, such as during highway driving, there is a possibility of a fall in vehicle dynamic behavior (vehicle stability) owing to a rapid steering assist. Conversely during the vehicle traveling at low speeds such as during cornering or parking, in order to provide good handling, a comparatively great steering assist force is required. Thus, under the specified condition defined by VSP≧VSPf, such as during highway driving, it is possible to enhance the vehicle stability by inhibiting boost operation. In this manner, by executing boost operation only during the low-speed traveling, it is possible to suppress unnecessary boost operations.

In each of the shown embodiments, by means of booster circuit control section 34, the booster voltage Vd outputted from booster circuit 50 is risen from power source voltage Ve to desired boost-up voltage Vdt, which is a fixed voltage value. In lieu thereof, desired boost-up voltage Vdt may be variably set in a stepwise manner (in two or more stages) or steplessly based on a vehicle's traveling state, such as a steering state of steering wheel a1, vehicle speed VSP, motor angular acceleration αm, and/or duty cycle value Duty of the PWM signal. That is, desired boost-up voltage Vdt may be variably determined or set based on the vehicle's traveling state, such as, a steering state of steering wheel a1 (e.g., steering wheel angle θ, steering-wheel angular velocity ω, and/or steering-wheel angular acceleration vθ=dω/dt=d²θ/dt²), vehicle speed VSP, motor angular acceleration αm, and/or duty cycle value Duty of the PWM signal, by way of multistage-control or multistage-adjustment. Thus, it is possible to more precisely set the desired boost-up voltage Vdt, and whereby it is possible to effectively suppressing electric power consumption of battery 52.

In the shown embodiments, as a parameter utilized to determine whether boost control should be initiated, in other words, as a measure (or a criterion) in case that a lack of steering assist force is likely to occur, either one of motor angular acceleration αm, steering torque rate-of-change ΔTs, steering-wheel angular acceleration vθ, PWM duty rate-of-change ΔDuty, and current-value deviation ΔIm between the calculated motor command current value Imo and the actual motor current value Im, is utilized. Alternatively, a combined parameter of these parameters am, ΔTs, vθ, ΔDuty, and ΔIm may be utilized. Also, in order to more precisely suppress unnecessary boost operations, vehicle speed VSP may be further considered as a combined parameter. In such a case, when the combined parameter exceeds its threshold value, the system is configured to engage (enable) the boost control function.

The fundamental concept of the power steering devices of the shown embodiments is hereunder summarized by contrast with the conventional technology.

(1) Due to the basic motor characteristic, motor torque Tm becomes insufficient owing to the occurrence of counter electromotive force, as motor speed Nm increases.

(2) In the conventional device, when motor speed Nm becomes greater than or equal to a predetermined threshold value, motor torque Tm was earned by boosting up or rising power source voltage (battery voltage).

(3) However, in the case of a hydraulic power cylinder equipped power steering device that produces a steering assist force via working fluid pressure generated by a motor-driven pump, even if a boost operation is initiated to compensate for the insufficient motor torque at a point of time that the motor speed becomes greater than or equal to the predetermined threshold value, a response delay in a working fluid pressure rise occurs.

(4) That is, the power cylinder serves as an integral element, via which rotation of steering wheel a1 and rotation of motor 1 are linked to each other.

(5) This means that, in order to produce motor speed Nm and motor torque Tm corresponding to a desired working fluid pressure value required for the power cylinder, motor speed Nm must be risen up to a speed value higher than a variation in steering wheel angle θ at a stretch in a manner so as to compensate for the response delay of the integral element (i.e., the power cylinder).

(6) The response delay of the integral element remarkably appears in a particular state where steering-wheel angular velocity ω is fast and the deviation between the actual working fluid pressure and the desired fluid pressure is great.

(7) For the reasons discussed above, the improved systems of the shown embodiments compensate for the response delay of the integral element (i.e., the power cylinder) by timely initiating the boost operation when it is predicted that the deviation between an actual steering assist force and a desired steering assist force will become great.

As will be appreciated from the first through seventh embodiments, the booster circuit control section 34 included in the power steering control system operates to switch on the booster circuit 50, when it is determined that there is a possibility of a response delay of hydraulic pressure supplied from the pump to the power cylinder.

A parameter used to predict the response delay of the integral element (i.e., the power cylinder) can be suitably selected from parameters used to calculate the desired steering-assist torque (or the desired steering-assist amount), such as vehicle speed VSP and steering torque Ts, or suitably derived from the calculation result of the desired steering-assist torque. In other words, assuming that the steering wheel side is defined as an upstream side of the steering control system and the steered road wheel side is defined as a downstream side, it is possible to suitably accurately set or determine a source-voltage boost timing by way of the derivative of at least one parameter detected upstream of the power cylinder included in the steering control system, such as parameters αm (corresponding to the second-order derivative $d^2θm/dt^2$ of motor rotation angle θm), ΔTs (corresponding to the derivative dTs/dt of steering torque Ts), vθ (corresponding to the second-order derivative $d^2θ/dt^2$ of steering wheel angle θ), ΔDuty (corresponding to the derivative dDuty/dt of PWM duty cycle signal value Duty), and ΔIm (substantially corresponding to the derivative of actual motor current value Im).

The entire contents of Japanese Patent Application No. 2005-239335 (filed Aug. 22, 2005) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A power steering device comprising:
    a hydraulic power cylinder configured to assist a steering force of a steering mechanism linked to steered road wheels;
    a pump configured to supply hydraulic pressure to a selected one of two hydraulic cylinder chambers defined in the power cylinder;
    an electric motor configured to drive the pump;
    a driving power source configured to supply electric power to the motor; and
    a power steering control system electrically connected to at least the motor and the driving power source, and configured to control a driving state of the motor and a power source voltage of the driving power source;
    the power steering control system including:
        a motor control circuit configured to generate a motor driving signal, whose command signal value is determined based on a steering assist force applied through the power cylinder to the steered road wheels;
        a booster circuit configured to boost the power source voltage of the driving power source;
        a motor angular acceleration detection circuit configured to detect or estimate a motor angular acceleration; and
        a booster-circuit control circuit configured to control, responsively to the motor angular acceleration, switching between operating and non-operating states of the booster circuit,
    wherein the motor includes a brushless motor having an angular position sensor configured to detect an angular position of a brushless-motor rotor, and the motor angular acceleration detection circuit estimates the motor angular acceleration based on a sensor signal from the angular position sensor, and
    wherein the booster-circuit control circuit is configured to switch on the booster circuit, when the estimated motor angular acceleration becomes greater than or equal to a motor-angular-acceleration threshold value.

2. The power steering device as claimed in claim 1, comprising:
    a vehicle speed sensor configured to detect a vehicle speed; and
    a vehicle-speed dependent boost control inhibition circuit configured to inhibit a boost operation of the booster circuit when the vehicle speed is greater than or equal to a predetermined speed value.

3. The power steering device as claimed in claim 1, wherein:
    the booster-circuit control circuit variably sets, based on a vehicle's traveling state, a desired boost-up voltage, to which a booster voltage outputted from the booster circuit is boosted from the power source voltage, steplessly or in a stepwise manner.

4. A power steering device comprising:
    a hydraulic power cylinder configured to assist a steering force of a steering mechanism linked to steered road wheels;
    a pump having a pair of ports through which hydraulic pressure is supplied via first and second fluid lines to respective hydraulic cylinder chambers defined in the power cylinder;
    an electric motor configured to drive the pump in a normal-rotational direction and in a reverse-rotational direction;
    a driving power source configured to supply electric power to the motor; and
    a power steering control system electrically connected to at least the motor and the driving power source, and configured to control a driving state of the motor and a power source voltage of the driving power source;
    the power steering control system including:
        a motor control circuit configured to generate a motor driving signal, whose command signal value is determined based on a steering assist force applied through the power cylinder to the steered road wheels;
        a booster circuit configured to boost the power source voltage of the driving power source;
        a motor angular acceleration detection circuit configured to detect or estimate a motor angular acceleration; and a booster-circuit control circuit configured to control, responsively to the motor angular acceleration, switching between operating and non-operating states of the booster circuit, wherein the motor includes a brushless motor having an angular position sensor configured to detect an angular position of a brushless-motor rotor, and the motor angular acceleration detection circuit estimates the motor angular acceleration based on a sensor signal from the angular position sensor, and wherein the booster-circuit control circuit is configured to switch on the booster circuit, when the estimated motor angular acceleration becomes greater than or equal to a motor-angular-acceleration threshold value.

5. The power steering device as claimed in claim 4, comprising:

a vehicle speed sensor configured to detect a vehicle speed; and a vehicle-speed dependent boost control inhibition circuit configured to inhibit a boost operation of the booster circuit when the vehicle speed is greater than or equal to a predetermined speed value.

6. The power steering device as claimed in claim 4, wherein:

the booster-circuit control circuit variably sets, based on a vehicle's traveling state, a desired boost-up voltage, to which a booster voltage outputted from the booster circuit is boosted from the power source voltage, steplessly or in a stepwise manner.

* * * * *